United States Patent [19]
Meystel et al.

[11] Patent Number: 6,102,958
[45] Date of Patent: *Aug. 15, 2000

[54] MULTIRESOLUTIONAL DECISION SUPPORT SYSTEM

[75] Inventors: Alexander Meystel, Bala Cynwyd, Pa.; Sameh Uzzaman, Cherry Hill, N.J.

[73] Assignee: Drexel University, Philadelphia, Pa.

[ * ] Notice: This patent issued on a continued prosecution application filed under 37 CFR 1.53(d), and is subject to the twenty year patent term provisions of 35 U.S.C. 154(a)(2).

[21] Appl. No.: 08/835,539

[22] Filed: Apr. 8, 1997

[51] Int. Cl.$^7$ .......................... G06F 17/10; G06F 101/10
[52] U.S. Cl. .................. 703/2; 703/1; 703/7; 703/12; 700/286; 706/906; 706/907
[58] Field of Search .................... 706/906, 907; 703/1, 2, 7, 9, 12; 700/286

[56] References Cited

U.S. PATENT DOCUMENTS

| | | | |
|---|---|---|---|
| 5,083,256 | 1/1992 | Trovato et al. | 700/56 |
| 5,301,284 | 4/1994 | Estes et al. | 711/203 |
| 5,305,230 | 4/1994 | Matsumoto et al. | 364/528.22 |

OTHER PUBLICATIONS

Karsai et al, "Models and Model Building In Intelligent Process Control Systems", 5th IEEE International Symposium on Intelligent Control, pp. 351–357, Sep. 1990.

"Semiotic Multiresolutional Analysis of a Power Plant"; C. Corson, A. Meystel, F. Otsu and S. Uzzaman; Aug. 27–29, 1995.

"System with Multiscale Architectures for Representation and Transformation (SMART) Plant Project—Phase I Edge Moor Demonstration—Final Report"; F. Otsu, C. Corson, A. Meystel, S. Uzzaman, H. Ward and J. Dougherty, Jun. 30, 1995.

*Primary Examiner*—Kevin J. Teska
*Assistant Examiner*—Samuel Broda
*Attorney, Agent, or Firm*—Akin, Gump, Strauss, Hauer & Feld, L.L.P.

[57] ABSTRACT

A process control system determines optimal trajectories (input controls) using multiresolutional analysis of acquired data. In contrast to conventional control systems, the present control system does not use a predetermined mathematical model or algorithm to define the process in terms of a plurality of variables. Rather, the present system acquires system data and stores the data in a multiresolutional data structure. A knowledge base is created which can be searched at varying levels of resolution for determining optimal process trajectories. The continual addition of data to the data structure allows for continual top-down refinement of the determined trajectories and bottom-up improvement and updating of the system representation.

5 Claims, 10 Drawing Sheets

MULTIRESOLUTIONAL DECISION SUPPORT SYSTEM

BACKGROUND OF THE INVENTION

The present invention relates to a system for multiresolutional analysis of a complex system which cannot be adequately described with a mathematical model, and more particularly, to a method of multiresolutional analysis for optimizing the performance of an industrial facility, system and/or device which do not have an adequate model of representation.

Human beings accomplish tasks by developing an organized hierarchical structuring of information which "lumps" information at various levels of "resolution" (granularity, and/or scale). The information is then retrieved and employed at the appropriate resolution level. Information collected at a more general, or overview level is generally considered to be less precise, but more easily retained and retrieved. Such data is said to be low resolution level. Information collected at a detailed level is typically more precise, but is more difficult to retain and retrieve because of its abundance. Also it increases the complexity of computation to a prohibitively high level. Such detailed information is generally termed high resolution level data. The complexity of computations at this level can be bounded by reducing the scope of the represented space of interest. When an individual acts on a task, the normal process is to constrain detailed action (higher resolution activity) based on general information (lower resolution data). A process of selecting "good" versus "bad" data is employed to make decisions.

Simulation and modeling systems use mathematical models to fully describe systems or activities. The difference between the human approach and a computer-simulated approach is that the human mind does not rely on such mathematical models. The concept and application of different resolution levels to automation and control systems is normally referred to as "supervisory control" and has been used in limited applications where the lower resolution system is only one or two levels above the higher resolution system. One such example is a unit load control system in a power plant. In such a system, the required megawatt (MW) output demand is defined at an overview level for the system. The demand value is then used in constraining functions to control subsystems (e.g., fuel/air, feed water, turbine valves) such that the megawatt demand is met. The operation of a power generating station highlights the semiotic relationships of dependent and independent process variables at multiple, discrete levels of resolution.

Generally, planning and control systems include a specified goal according to some cost or other criterion. The classical approach to designing a control system generally comprises three stages: (1) develop or identify a model of the process or operation to be controlled, (2) validate the model using a known range of operating conditions, and (3) select optimal input values to achieve a desired system behavior. The first stage, development of a model, involves the selection of an appropriate mathematical structure for purposes of identification. The mathematical structure represents a class of models which may be used to reproduce the input-output relationship of the system to be controlled. The semiotic character of the relationships in this case is taken care of by the symbol grounding procedures which employ on-line or pretabulated operations of interpretation. The mathematical structure is associated with a set of parameters, $\Theta$, so that the class of models may be represented in symbolic form as $M(\Theta)$. The identification problem involves determining the parameter set such that the difference between an observed and predicted input-output behavior of the target system is minimized across the class of models. The second, validation stage may be performed concurrently with identification. The role of the validation stage is to verify the fidelity of the model across the expected range of operating conditions for the target system. In a system with an analytical model, validation is of deep concern because, in reality, the models are valid only for a limited time period, and in large complex systems, the limited time period is very small. The final stage is behavior generation, where having synthesized an adequate mathematical model, the selection of optimal input-output behavior is attempted using one of several existing analytical techniques. The latter are usually associated with well-known techniques (such as dynamic programming and/or maximum principle) however all of them dwell upon search algorithms and are very costly computationally. In order to provide for the input-output behavior, input-output maps are computed and a second set of maps is generated for error compensation. When this approach is applied on-line, it is called control; when this approach is applied off-line, it is called planning. The latter is used to compute feedback control strings so that the on-line control (feedback compensation) can be done only to compensate for deviations from a feed-forward generated planned trajectory.

In the classical approach, several implicit assumptions are made in order to simplify the required analysis. The most common and significant of the assumptions is that the class of models may be chosen from a set of smooth differential equations of the type:

$$y(t)+a_1 y^{(n-1)}(t)+a_2 y^{(n-2)}(t)+\ldots+a_n y(t)=b_1 u^{(n-1)}(t)+b_2 u^{(n-2)}(t)+\ldots+b_n u(t)$$

for which the parameter set could be written as $\Theta=(a_1, a_2, \ldots, a_n, b_1, b_2, \ldots, b_n)$. A more general formulation of the class of mathematical structures might be closer to $$x(t)=Ax(t)+Bu(t)+V(t)+N(x,u,t)$$

$$y(t)=Cx(t)+W(t)+M(x,u,t)$$

where the A, B, and C matrices are coefficients of terms linear in state and input, V and W are noise terms, and N and M are non-linear components of the model. Further, generality could be obtained by including partial derivatives in the formulation.

The use of a class of candidate models which is capable of representing stochastic and non-linear dynamics which contribute significantly to system behavior in many settings, raises the complexity of behavior generation and optimization strategies. The difficulties grow substantially when both input-output pairs, as well as the parameter set are subject to disturbances. The problem becomes very difficult to solve when the system demonstrates distributed character. Existing analytical techniques are not suited to mathematical models in this form. Consequently, superior identification techniques are of little value unless methods of behavior generation and optimization are utilized which can determine useful strategies for this class of models. The classical approach is especially difficult to apply when trying to control a large complex system. Mathematical models for such systems are not well known and often are erroneous, so that the results of computations are fuzzy.

The present invention is directed to a process control system which determines optimal trajectories (input controls) using multiresolutional analysis of acquired data. In contrast to prior art control systems, the present invention does not use a predetermined mathematical model or algorithm which defines the process in terms of a plurality of variables. Rather, the present invention acquires system data and stores the data in a multiresolutional data structure. A knowledge base is thus created, which is searched at varying levels of resolution for determining optimal process trajectories. This base can be called "a model" in a very general sense. It is rather a fluid "provisional data structure" which is created and recreated on demand, to support the decision making process. The continual addition of data to the data structure allows for continual refinement of the determined trajectories.

SUMMARY OF THE INVENTION

Briefly stated, the present invention comprises a multiresolutional decision support system for determining output trajectories for a predetermined output behavior of a plant or a process and for generating control signals for achieving the predetermined output behavior. The system comprises:

- means for acquiring data related to at least one process variable of the plant or process;
- means for organizing the acquired data into goal independent units and fusing the units into associative clusters of information;
- means for storing the associative clusters of information in a multiresolutional data storage structure;
- means for searching the multiresolutional storage structure at successively more abstract levels of resolution in a bottom-up processing, or less and less abstract levels of resolution in a top-down processing, both utilized to determine a trajectory for achieving the predetermined output behavior; and
- means for translating the search results into control signals for causing the plant or process to achieve the predetermined output behavior.

In a second embodiment, a multiresolutional system for determining optimal trajectories of a process having a plurality of operational variables and cost functions is disclosed in which the system comprises:

- means for acquiring data relating to at least one of the operational variables;
- means for organizing the operational variables into a representative hierarchy;
- a multiresolutional data storage structure for storing the acquired data according to the representative hierarchy;
- means for embedding local dynamics of the process into at least one level of resolution of the data stored in the data storage structure; and
- means for synthesizing optimal trajectories of process operation using a search applied to the multiresolutional representation.

In yet another embodiment, a multiresolutional decision support system for monitoring and controlling a plant or process and for determining optimal trajectories of operation for achieving a predefined operational behavior of the plant or process, the plant or process including a plurality of operational variables and cost constraints is disclosed in which the system comprises:

- a plurality of sensors for monitoring and acquiring data from a plurality of subsystems of the plant or process, the data relating to at least one of the operational variables;
- a memory device for storing the acquired data;
- means for organizing the operational variables into groups of goal-independent input-output rules;
- a data structure for storing the acquired data in a multiresolutional representation in accordance with the rules such that local dynamics of the plant or process are embedded in the data structure;
- processor means for recursive algorithmic multiresolutional search of the data stored in the data structure at varying levels of resolution and generating an optimal trajectory of operation of the plant or process for achieving the predefined operational behavior; and
- control signal generation means for generating at least one control signal for controlling the operation of the plant or process according to the optimal trajectory in order to achieve the predefined operational behavior.

A further embodiment of the present invention comprises, in a power plant, a planning and control system for determining output trajectories of a predefined output behavior and input control commands for achieving the predefined output behavior, the system comprising:

- means for acquiring data related to at least one process variable of the power plant;
- means for organizing the acquired data and generating at least one state input-output string therefrom;
- means for fusing the acquired data into associative clusters, the clusters forming a function oriented, goal-independent provisional model of the power plant;
- means for generating a multiresolutional data structure based upon the associative data clusters for transforming the provisional model into at least one level of resolution incorporating embedded local dynamics of the power plant;
- means for searching the multiresolutional data structure at varying levels of resolution to determine an optimal trajectory of operation for achieving the predefined output behavior; and
- means for generating control signals for controlling at least one operational variable of the power plant such that the power plant operates according to the optimal trajectory.

In yet another embodiment, the present invention comprises a multiresolutional control system for plants and processes having a plurality of operational variables, constraints, and cost-functions, the control system for determining trajectories and corresponding input control signals for achieving a predefined output behavior, the system comprising:

(a) means for acquiring and organizing information related to at least one of the variables in the form of time-tagged quadruplets "state before-action-state after-value" strings;

(b) means for extraction of goal-independent data from the goal-dependent strings in the form of generalized rules;

(c) fusing components of the rules into associative clusters which form a function oriented goal-independent provisional model of the system, wherein multiple goal-independent and time-independent rules are clustered into more general rule statements, thereby producing a hierarchical system for storage and retrieval of rules;

(d) means for developing a multiresolutional data structure based upon the associative clusters which transforms the provisional relational model of the system into a multilevel hierarchical relational structure;

(e) means for bottom-up formation of resolutional clusters which provide for further development of the provisional model of the system;

(f) means for top-down focusing of attention upon a subset of data within the provisional model and developing envelopes of attention at least one level of resolution;

(g) means for matching the predefined output behavior to the provisional model of the system for at least one level of resolution;

(h) means for adjusting the constraints of the predefined operational behavior;

(I) means for adjusting the cost function of the system to the model of at least one level of resolution with at least one envelope of attention;

(j) means for searching within at least one envelope of attention for an optimal trajectory for achieving the predefined output behavior, wherein the process of searching is repeated consecutively at one or more levels of resolution with narrowing the search envelope and consecutive refinement of the results; and (k) means for generating system control signals at least at one level of resolution (otherwise, organized in a multiresolutional structure of control signals) related to the optimal trajectory for achieving the predefined system behavior.

The present invention further is a method of determining output trajectories for a predetermined output behavior of a plant or a process and for generating control signals for achieving the predetermined output behavior, the method comprising the steps of:

(a) acquiring data related to at least one process variable of the plant or process;

(b) organizing the acquired data into goal independent units and fusing the units into associated clusters of information, and recursively organizing the associated clusters of information into a new set of associated clusters of lower resolution until a lowest level of resolution is achieved;

(c) storing the associated clusters of information in a multiresolutional data storage structure;

(d) searching the multiresolutional storage structure at successively higher levels of resolution to determine a trajectory for achieving the predetermined output behavior and propagating the search results successively at the lower levels of resolution; and (e) translating the search results into control signals for causing the plant or process to achieve the predetermined output behavior.

In another embodiment, the present invention is a method of determining optimal trajectories of a process having a plurality of operational variables and cost functions, the method comprising the steps of:

(a) acquiring data relating to at least one of the operational variables;

(b) organizing the operational variables into a representative multiresolutional hierarchy;

(c) storing the acquired data according to the representative multiresolutional hierarchy in a multiresolutional data storage structure;

(d) embedding local dynamics of the process into at least one level of resolution of the data stored in the data storage structure; and (e) synthesizing optimal trajectories of process operation using a search applied to the multiresolutional representation at successively higher levels of resolution with subsequent propagation of the search results to successively lower levels of resolution.

In yet another embodiment, the present invention is a method of monitoring and controlling a plant or process and of determining optimal trajectories of operation for achieving a predefined operational behavior of the plant or process, the plant or process including a plurality of operational variables and cost constraints, the method comprising the steps of:

(a) monitoring and acquiring data using a plurality of sensors, from a plurality of subsystems of the plant or process, the data relating to at least one of the operational variables;

(b) storing the acquired data in a memory device;

(c) organizing the operational variables into groups of goal-independent input-output rules;

(d) storing the acquired data in a data structure in a multiresolutional representation in accordance with the rules such that local dynamics of the plant or process are embedded in the data structure;

(e) recursively searching the data stored in the data structure at varying levels of resolution and synthesizing an optimal trajectory of operation of the plant or process for achieving the predefined operational behavior; and (f) generating at least one control signal for controlling the operation of the plant or process according to the optimal trajectory in order to achieve the predefined operational behavior.

The present invention is further a method for determining output trajectories of a predefined output behavior and input control commands for achieving the predefined output behavior, in a power plant. The method comprises the steps of:

(a) acquiring data related to at least one process variable of the power plant;

(b) organizing the acquired data and generating at least one state input-output string therefrom;

(c) fusing the strings into associative clusters, the clusters forming a function oriented, goal-independent provisional model of the power plant;

(d) generating a multiresolutional data structure based upon the associative data clusters for transforming the provisional model into at least one level of resolution incorporating embedded local dynamics of the power plant;

(e) recursively searching the multiresolutional data structure at varying levels of resolution to determine an optimal trajectory of operation for achieving the predefined output behavior; and (f) generating control signals for controlling at least one operational variable of the power plant such that the power plant operates according to the optimal trajectory.

The present invention is also a method for plants and processes having a plurality of operational variables, constraints, and cost-functions, for determining trajectories and corresponding input control signals for achieving a predefined output behavior, the method comprising the steps of:

(a) acquiring and organizing information related to at least one of the variables in the form of time-tagged quadruplets "state before-action-state after-value" strings;

(b) extracting goal-independent data from the goal-dependent strings in the form of generalized rules;

(c) fusing components of the rules into associative clusters which form a function oriented goal-independent provisional model of the system, wherein multiple goal-independent and time-independent rules are clustered into more general rule statements, thereby producing a hierarchical system for storage and retrieval of rules;

(d) developing a multiresolutional data structure based upon the associative clusters by using a recursive computational process which transforms the provisional relational model of the system into a multilevel hierarchical relational structure;

(e) bottom-up recursive formation of resolutional clusters within the multiresolutional data structure, which provides for further development of the provisional model of the system;

(f) top-down recursive focusing of attention upon a subset of data within the provisional model and developing envelopes of attention at least one level of resolution;

(g) matching the predefined output behavior to the provisional model of the system for at least one level of resolution;

(h) adjusting the constraints of the predefined operational behavior;

(I) adjusting the cost function of the system to the model with at least one envelope of attention;

(j) searching within at least one envelope of attention for an optimal trajectory for achieving the predefined output behavior, wherein the process of searching is repeated consecutively at one or more levels of resolution with narrowing the search envelope and consecutive refinement of the results, wherein the search results are consecutively propagated from the bottom up to the lower levels of resolution; and (k) generating system control signals related to the optimal trajectory for achieving the predefined system behavior.

BRIEF DESCRIPTION OF THE DRAWINGS

The foregoing summary, as well as the following detailed description of a preferred embodiment of the invention, will be better understood when read in conjunction with the appended drawings. For the purpose of illustrating the invention, there is shown in the drawings an embodiment which is presently preferred. However, it should be understood that the invention is not limited to the precise arrangement and instrumentalities disclosed. In the drawings.

DETAILED DESCRIPTION OF PREFERRED EMBODIMENTS

Figure 1:
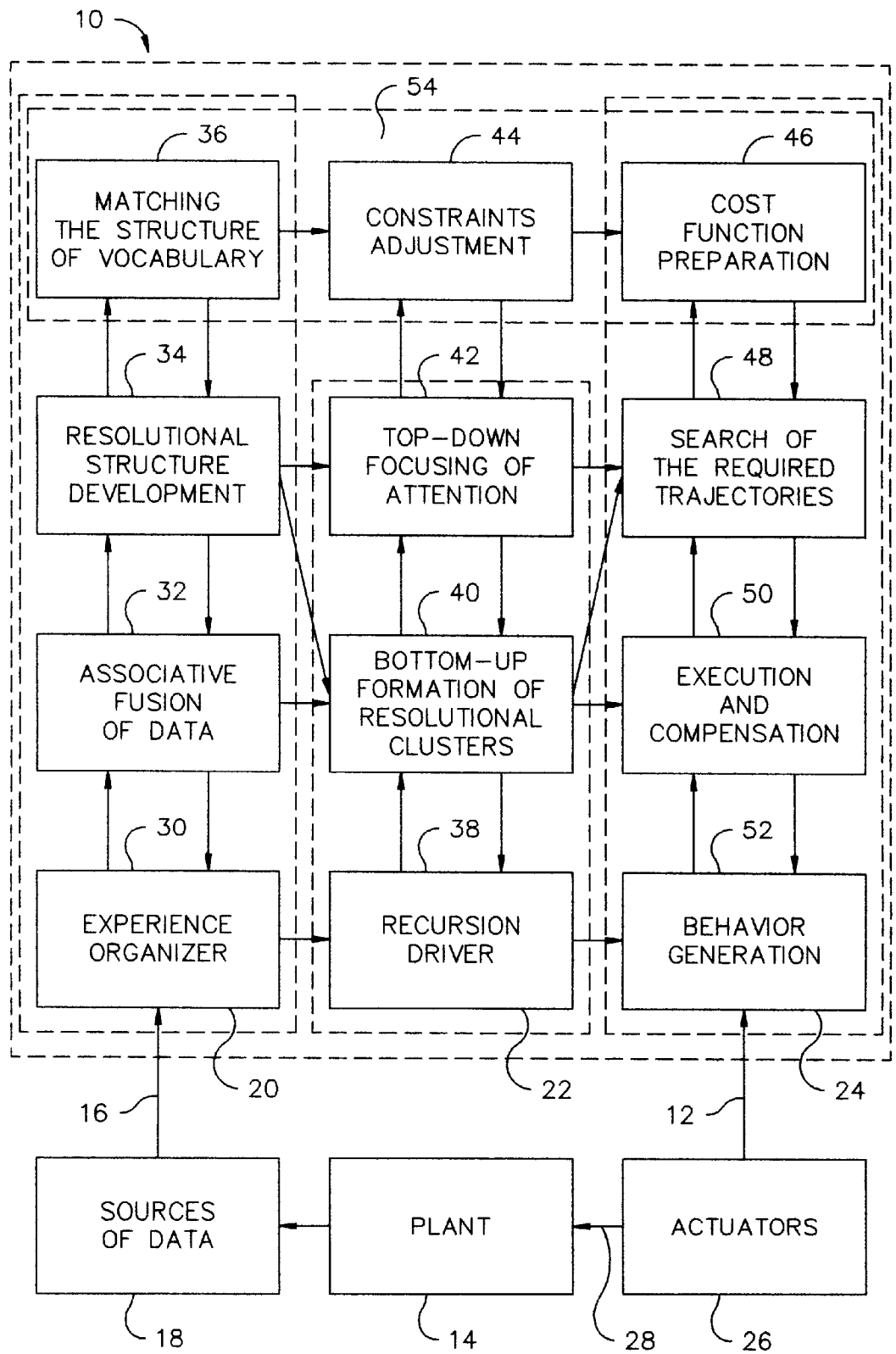
FIG. 1 is a schematic architectural block diagram of a control system in accordance with the present invention.

The list of desirable properties of an intelligent system includes the ability to "dynamically navigate" through an unstructured and partially unknown environment (processed state space) using a knowledge base and planning, to make predictions or form hypotheses, and to demonstrate an ability to learn. According to the present invention, it is possible to describe a dynamic system without using a conventional dynamic model, but rather by a properly organized knowledge base of prior experiences which serve as a virtual, provisional model. A recursive algorithmic process of planning, followed by the selection of a smaller space for more detailed analysis, is applied at each level of precision to derive trajectories or paths at a predefined final precision. The trajectory derivation is done in a manner which restricts the quantity of data required at each iteration, even as the working precision increases by several orders of magnitude.

The present invention comprises a multiresolutional decision support system (MDSS) for plant performance enhancement. MDSS implements selected features of multiresolutional control theory to assist in the process of making optimal, or cost minimizing, decisions for both process control and design. MDSS is able to integrate information from diverse sources or subsystems and, without using models or equations, to formulate plans or rules of system operation which provide the best performance according to a set of criteria of interest, subject to the constraints of available information. One of the main features of MDSS is an ability to generalize precise information (acquired data) into successively more abstract levels of resolution, which allows a significant reduction in the complexity of analysis of alternatives. Such analysis can, therefore, be performed via successive refinement of increasingly accurate projections within a more constrained envelope at each level of resolution. Once the multiresolutional structure of consecutively generalized data is constructed, a top-down "navigation" is possible which constitutes the core of the MDSS functioning.

MDSS efficiently analyzes distributed system information obtained as a result of on-line data acquisition. Acquired data is organized in a hierarchy of scale and scope, permitting examination in a narrower envelope at each succeeding level of higher resolution. Each plan determined at a higher resolution is more detailed than at preceding (lower resolution) levels and is based on a more localized and precise examination of selected information. The hierarchical organization dramatically reduces the complexity of information storage and analysis. MDSS allows the use of a distributed modeling technique with information acquired and embedded into the model, to synthesize optimal strategies of operation.

The multiresolutional knowledge representation forms the basis that is used to synthesize feed-forward trajectories of optimal control. The collection of data is performed by testing a process or plant within the boundaries of its normal operation. The benefits of the present invention include a reduction in the real costs of operating or designing processes, with a relatively insignificant expenditure of time and effort in the automated analysis of available system information.

MDSS allows at least three modes of operation: off-line, on-line, and design phase. Off-line mode provides supervision and planning of process information. On-line mode provides monitoring and control of processes according to predefined criteria of optimality. Design phase mode provides selection of system or process components which reduce the cost of achieving required process performance targets.

Referring now to the drawings, wherein the same reference numeral designations are applied to corresponding elements throughout the several figures, there is shown in FIG. 1 a schematic architectural block diagram of a multi-resolutional decision support system 10 of the present invention for generating input commands or control commands 12 for complex systems, e.g. a manufacturing facility, a robot, a power plant or corresponding processes 14. The control commands 12 are generated based on a calculation by the system 10 of an optimal trajectory or path for achieving a predetermined, desired output behavior of the plant or process 14. The data 16 is input to the system 10 from sources of data 18. The sources of data 18 monitor a plurality of variables of functioning constraints and cost-functions of the plant or process 14. The sources of data 18 may comprise sensors (not shown) which monitor the operation of subsystems of the plant or process 14. The sources of data 18 may be interpreted also, as humans observing the process and submitting the required information. In FIG. 1, arrows connecting certain blocks are shown which represent the direction and flow of information between such blocks.

The system 10 may be broken down into a plurality of subsystems, with each subsystem including one or more operational modules. A first organizational subsystem 20 acquires all input based information, such as the data 16, and organizes such information for use by a modeling subsystem 22. The modeling subsystem 22 determines functional relationships of the organized data, which are searched by a behavior generation subsystem 24. The behavior generation subsystem 24 generates the control commands 12, which are provided to an actuator block 26. The actuator block 26 translates the control commands 12 into process control signals 28 for physically controlling, modifying or altering the operation of the plant or process 14.

The first organizational subsystem 20 preferably comprises an experience organizer module 30, an associative fusion of data module 32, a resolutional structure development module 34 and a matching the structure of vocabulary module 36. The experience organizer module 30 comprises means for acquiring, organizing, and storing information, such as the data 16, which is related to predetermined variables of interest of the plant or process 14. Preferably, the acquired data 16 is organized into goal dependent units of information, such as time-tagged quadruplets "state-before-action, state-after-value" strings, also termed "experiences". The experiences are classified in order to permit accurate and plausible inferences to be drawn therefrom. Accordingly, the experience organizer module comprises storage structures which allow for memorizing the goal-dependent quadruplets of "experiences" and organizing their subsequent classification. Since the incoming flow of "experiences" for any process is generally very large, the volume of memory required has a tendency of growing very quickly. Thus, the storage structures for acquiring and organizing information should allow for functioning with a required level of information efficiency. The latter can be achieved by a variety of measures, such as prearranged forgetting and consecutive generalization of experiences based upon unifying experiences which are similar in preconditions, action, and effect but having a lower resolution of representation. The latter produces eventually a hierarchical system for storage and retrieval of experiences.

The associative fusion of data module 32 forms a statement of rules from the data stored and organized by the experience organizer module 30. The rules differ in the degree of belief which is assigned based upon repetitiveness of the particular experiences (statistical) or trustworthiness of the particular source of information (expert). The associative fusion of data module 32 comprises means for extraction of goal-independent data from the stored goal-dependent "experiences", in the form of generalized rules, or components of an automata transition function and state-output functions. The extraction means may comprise any standard algorithm and/or procedure for inverting experimental causalities into the statements of rules. Preferably, more sophisticated procedures are applied to the organized data, linked with algorithms and procedures of fusing the experiences into "associative clusters". Such clusters form a function oriented, goal-independent provisional model of the plant or process 14. In order to obtain such provisional models, a mechanism of "consecutive generalization" is applied based upon unifying groups of higher resolution information into lower resolution units. However, instead of using experiences similar in preconditions, action, and effect as inseparable units (as done by the experience organizer module 30), the associative fusion of data module 32 looks for similarities in components of the experiences, which leads to rules generation without explicit demonstration of partial dependencies demonstrated in the acquired data 16. Multiple goal-independent and time-independent rules are clustered into more general rule statements, thereby producing eventually a hierarchical system for storage and retrieval of rules from which the provisional relational model of the plant or process 14 is combined subsequently.

The resolutional structure development module 34 comprises means for developing a multiresolutional data (knowledge) structure based upon the "associative clusters", which can transform the provisional relational model into a multilevel hierarchical relational structure with any required number of levels of resolution, including embedded local dynamics of the plant or process 14. Such multiresolutional data structure development means include standard algorithms and procedures for clustering and hierarchical ordering of the units forming the relational model. Although such conventional means can be used, the interpretation of the results, preferably the process of hierarchical ordering, ends when the resolutional structure of representation is obtained, wherein each level is associated with a particular resolution level of the plant or process 14.

The matching the structure of vocabulary module 36 comprises means for matching a statement of the assignment to the content of the provisional model with at least one level of resolution. The statement of the assignment defines a desired predetermined output of the plant or process 14. Such means for matching may comprise any standard algorithm and/or procedure for component-by-component list browsing and for ordering the lists in correspondence.

The aforedescribed modules 30–36 form a unified subsystem 20 of organization of sensory (and any input-based) information. The number of modules shown is not related to the number of the resolution levels which can be obtained by the system 10.

The modeling subsystem 22 preferably comprises a recursion driver module 38, a bottom-up formation of resolutional clusters module 40 and a top-down focusing of attention module 42. The recursion driver module 38 comprises means for guiding and coordinating bottom-up and top-down recursive processes of knowledge organization performed by the bottom-up and top-down modules 40, 42. Such guiding and coordinating means include any standard algorithm and/or procedure for registering, nesting and checking conditions of inclusion and monitoring imposition of quantitative constraints.

The bottom-up formation of resolutional clusters module 40 comprises means for bottom-up formation of multiresolutional clusters which provide for further development of the model of the plant or process 14 from a provisional model into an applied model with at least one level of resolution. Such means for bottom-up formation include all standard algorithms and procedures for clustering, including such standard solutions as K-means, as well as any another algorithmic tool of cluster generation. After completion of the cluster generation, the cluster generation algorithm is applied to the newly created clusters, which may be considered as objects, in a recursive fashion.

The top-down focusing of attention module 42 is experience-based and goal-oriented, and serves the purpose of complexity reduction. The top-down focusing of attention module 42 comprises means for top-down focusing attention upon a subset of data within the model of the plant or process 14 and developing "envelopes of attention" at each level of resolution. Such top-down focusing means may comprise any standard algorithm and/or procedure for data and knowledge pruning by imposing constraints and boundaries.

The system 10 further preferably comprises a constraints adjustment module 44. The constraints adjustment module 44 includes means for adjusting the constraints of the assignment (desired output) under the vocabulary to the results of further development of the model over the multiresolutional model. Such adjusting means include any standard algorithm and/or procedure for checking numerical conditions for interval assignment and introducing of corrections in a case where the conditions are not satisfied.

The behavior generation subsystem 24 includes a cost function preparation module 46, a trajectory (path) search module 48, an execution and compensation module 50, and a behavior generation module 52. The cost function preparation module 46 comprises means for adjusting a cost function, formulated in the assignment (desired output), to the model with multiple envelopes of attention. Such adjusting means include any standard algorithm and/or procedure for assigning and computing a measure for a particular space (representation).

The trajectory (path) search module 48 determines a preferable measure of the space, which is preferably based both upon additive and multiplicative forms, and comprises means for searching within each envelope of attention for the assignment of the output motion and input planning/control commands, which provide for the required cost-function under the particular set of constraints. Such searching means include any standard algorithm and/or procedure for different types of search, such as depth-first, breadth-first, Dijkstra, A-star, random search, genetic search, etc., as well as techniques of dynamic programming. It will be understood by those of skill in the art that different kinds of searching may be preferable for different systems in different cases. Since the model of the plant or process 14 generally contains one or more levels of resolution, the process of searching is preferably repeated consecutively at one or more levels of resolution with narrowing the search envelope and consecutive refinement of the results if the representation contains more than one resolution level.

The execution and compensation module 50 comprises means for distributing planned sequences of control commands 12 among the actuators of the actuator block 26, comparing a planned output with a real output, and introducing a compensation command component (i.e. a feedback signal) under a particular (previously selected) control law at each level of resolution. Such command distribution means include any standard algorithm and/or procedure of inverting the planned output to the input of an actuator and introducing a feedback law of compensation.

The behavior generation module 52 comprises means for interfacing the control commands 12 to the actuator block 26. Such interface means include all standard algorithms and procedures for providing communication between subsystems, such as a plurality of individual signal wires, a bus structure, encoded signal generation, etc.

The matching the structure of vocabulary module 36, the constraints adjustment module 44 and the cost function preparation module 46 may also be grouped together or unified as a second, separate, organizational subsystem 54, since these modules 36, 44, 46 preferably function in a coordinated fashion as an organizational infrastructure of the control system 10. The function of the second organizational system 54 is synthesis of "value judgment" required for selectors of the multiple procedures employed within the system.

Figure 2:
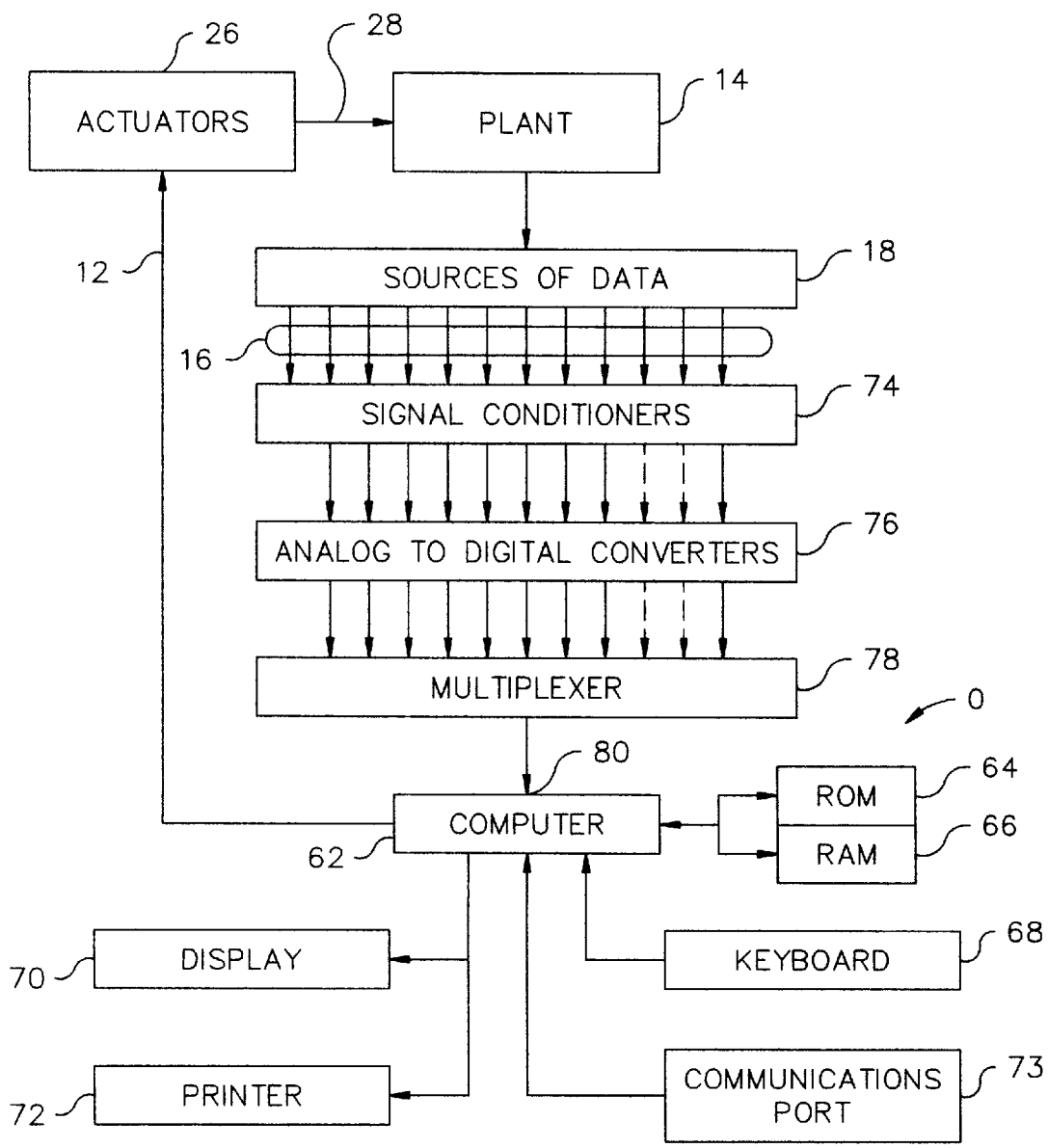
FIG. 2 is a schematic block diagram of a computer based control system in accordance with the present invention.

Referring now to FIG. 2, a functional schematic block diagram of a preferred embodiment of a computer-based system 60 for implementing the control system 10 of the present invention is shown. In the presently preferred embodiment, the computer system 60 includes a processing device or computer 62 which preferably is a personal computer or equivalent. The computer 62 includes a read only memory (ROM) 64 employed for storing fixed information including a computer program and random access memory (RAM) 66 of a predetermined size which is adapted for temporary storage of portions of a computer program as well as data for analysis. The computer 62 further includes a central processing unit or processor (not shown) and, in the present embodiment, a hard disk (not shown) of a type typically employed in such personal computers. While it is presently preferred that the computer 62 comprise a personal computer, it should be appreciated that any other suitable type of computer, such as a lap-top computer, mini computer, microprocessor, digital signal processor, mainframe computer, work station, etc., may alternatively be employed.

A keyboard 68 is employed as the primary input device to permit a user to communicate with the computer 62, although other input devices may also be used instead of or in addition to the keyboard 68, such as a mouse, a joy stick, voice commands, etc. A display, in the present embodiment a CRT display 70, and a suitable printer 72 are connected to the computer 62 for the display and recording of output from the computer 62. However, it should be understood that any other type of output device may be employed in addition to or instead of the display 70 and/or printer 72. Use of the sophisticated output devices employing visualization of abstract concepts, virtual reality, etc., can make application of MDSS more convenient but does not affect its principles of operation.

The computer 62 further includes at least one communication port 73 which may be either a parallel port, a serial port, or both. The communication port 74 is employed for receiving data from another location or sending data to another location utilizing a modem or other such transmission device (not shown) in a manner well known in the computer art.

The computer system 60 as thus far described is typical of a personal computer system well known to those skilled in the art. Variations in the input/output components of the computer system 60 may be made depending upon particular applications. For example, in some applications, it will not be necessary for both a printer 72 and a display 70. In other applications, a keyboard 68 may not be necessary. It should, therefore, be clearly understood by those skilled in the art that the present invention is not limited to the particular hardware configuration shown in FIG. 2 but may be implemented using any type of suitable hardware configuration.

The computer system 60 further includes a plurality of individual sensors shown collectively as the sources of data 18, for monitoring predetermined electrical, mechanical and other variables of the plant or process 14, and for converting the monitored characteristics into electrical signals (representing the data 16) for processing by the computer 62. In the present embodiment, the sources of data 18 includes a variety of different types of individual electrical and/or mechanical sensors of a type well known in the electrical and mechanical measurement art and commercially available from a variety of well known sources, such as vibration sensors, acoustic sensors, tachometers, pressure transducers, proximity probes, force sensors, torque sensors, temperature sensors, flow meters, voltage sensors, current sensors, etc. Complete details of the structure and operation of the various types of sensors for use with the present invention is not necessary for a complete understanding of the present invention. The particular type of sensors employed in the presently preferred embodiment should not be viewed as a limitation upon the invention. Each of the sensors are adapted to receive and convert sensed parameters related to the operation of the plant or process 14 into analogous standard electrical signals. In addition, as previously discussed, a human operator can be considered a valid source of the input information, supplementing or substituting the set of sensors.

The computer system 60 further preferably includes a plurality of signal conditioners 74 which are illustrated collectively. Preferably, a separate signal conditioner is provided for each of the sensors, with the respective output of the sensor being connected directly to the input to the respective signal conditioner 74. Each of the signal conditioners 74 functions in a manner well known in the art to amplify, impedance match, filter, scale, and otherwise standardize and improve the electrical output signal received from the corresponding sensor. Standardization of signals representing the data 16 includes conversion of currents to a proportional voltage, amplitude scaling and appropriate filtering to limit bandwidth. The precise structure and operation of each signal conditioner depends upon the particular type of sensor with which the signal conditioner 62 is employed. Preferably, each of the signal conditioners 62 further includes an anti-alias low pass filter which functions to improve the integrity of the acquired sensor data by filtering out, prior to digitizing, sensor signal frequencies greater than approximately half of the sampling rate of the digitizer.

The computer system 60 further includes a plurality of individual analog-to-digital converters 76 shown collectively. The analog-to-digital converters 76 function in a manner well known in the art to receive the conditioned and filtered analog output signals from the corresponding signal conditioner 74 and convert the received analog signals at a predetermined sampling rate into digital signals for data manipulation and analysis by the computer 62. A typical sampling rate could be 1,000 samples per second for each signal. Thus, each of the analog-to-digital converters 76 produces an output data array or bit stream corresponding to the particular sensor with which the analog-to-digital converter is associated.

The outputs of each of the analog-to-digital converters 76 are provided to the input of a multiplexer 78. The multiplexer 78 which, in the present embodiment is preferably a time division multiplexer, receives the data array signals from each of the analog-to-digital converters 76 and in a manner well known in the art transmits the received data array signals to an appropriate serial input port 80 of the computer 62 in a predetermined time spaced order.

It will be appreciated by those skilled in the art that the signal conditioners 74, analog-to-digital converters 76, and multiplexer 78 which are employed in connection with the presently preferred embodiment, are each of a type well known in the art and available from a variety of manufacturers. Complete details of the structure and operation of the signal conditioners 74, analog-to-digital converters 76, and multiplexer 78 are generally well known to those skilled in the art and need not be described in greater detail herein. Suffice it to say that the signal conditioners 74, analog-to-digital converters 76, and multiplexer 78 cooperate to take the raw operational data 16 from the sensors and convert the raw data 16 into a digital form suitable for processing by the computer 62. It will be appreciated by those skilled in the art that the functions of the signal conditioners 74, analog-to-digital converters 76, and multiplexer 78 may be combined into a single sub-assembly or may be performed in any of several different manners. Thus, while the preferred embodiment employs such components, such components are not intended to be a limitation on the present invention. Thus, the sensors, signal conditioners 74, analog-to-digital converters 76 and multiplexer 78 provide for data logging, and the computer system 60 provides for either analyzing the collected data or down-loading the collected data to another processor (not shown).

The present invention is capable of handling on-line information acquisition, disk-transfers, and manual data entry. In addition, a one-way communication link with the sensors and transmitters (not shown) can also be provided, since the operation of the system 60 can be decoupled from that of the plant or process 14. Further, the present system 60 can be integrated relatively simply with existing control systems which are capable of computer interface or contain PC level processing capabilities.

The above-described computer system 60 is employed for both on-line and off-line analysis of the operation of the plant or process 14. It should be appreciated by those skilled in the art that the present system 10 may be employed for analysis of any type of process, plant or facility whose operation is controlled by a plurality of variables, and that the embodiment shown in FIG. 2 is only for the purpose of illustrating a preferred embodiment of the structure and operation of the present invention.

Figure 3:
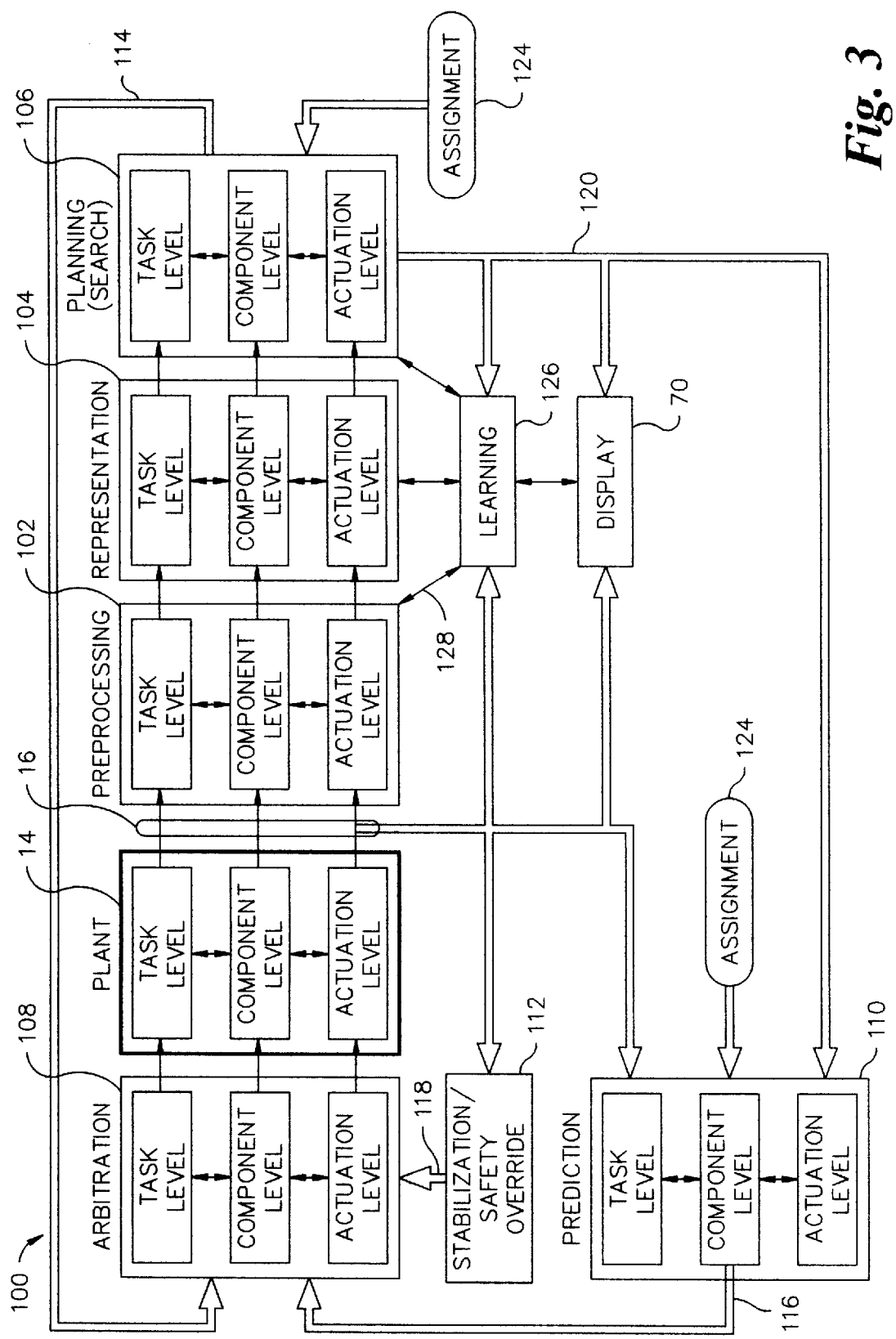
FIG. 3 is a schematic block diagram of the software architecture of the control system in accordance with FIG. 2.

Referring now to FIG. 3, a schematic block diagram of a multiresolutional intelligent control architecture in accordance with the present invention is shown. The structural hierarchy of a typical system, denoted 100, is shown with individual system elements comprising several levels of abstraction. FIG. 3 labels "task" through "actuator" levels, in order of increasing specificity. This partitioning reflects the fact that the operating points of the system 100 are frequently expressed in terms of subsystems, subsystem components, and so on, down to individual actuators within the overall system. In order for the complete system 100 to function properly, each subsystem and all of the subsystem components and actuators must correctly follow their prescribed assignment. The system 100 uses strings of states, instead of single states, and an experiential knowledge base, instead of conventional models, as discussed in more detail below.

Generally, the system 100 comprises a preprocessing subsystem 102, a representation subsystem 104, a planning or search subsystem 106, an arbitration subsystem 108, a prediction or optimization subsystem 110, and a stabilizing feedback subsystem 112. The plant or process 14 being controlled is monitored by a plurality of sensors, as previously discussed, which sensors provide data 16 for use by the system 100. The plant or process 14 includes several levels of data acquisition for a general multicomponent system running several concurrently actuated loops. The levels may be derived from physical considerations, such as dependence of one loop on a satisfactory operation of another loop. The operation of the control system 100 is discussed below.

The plant or process 14 performance can be measured by a variety of yardsticks, including financial savings, the meeting of regulatory standards, maximization of the operational life of a plant, and minimization of the need for operator intervention (reliability). As long as the cost measures, however objective, are tangible and may be evaluated from measurements, they can be incorporated into the present control system 100, either separately or in a weighted combination. As opposed to prior art analytical approaches, there is no constraint on the simultaneous evaluation of cost by a variety of measures.

The overall strategy of optimization and successive refinement employed in MDSS is contingent upon the creation of a multiresolutional representation. The key requirements of the system 100 are that it must contain a generalized representation of system capabilities at a resolution (level) that allows global optimization without violating computational restraints and that each level must contain a more dense (precise) representation than the previous level. If this is achieved, then search at each successive level of resolution generates a more precise solution of the optimization problem. If prior experiences are informationally rich, the process of optimization is based on such rich experiences, and if prior experiences are poor, interpolation and extrapolation may be required.

A multiresolutional representation may be visualized as a hierarchical store of information, incorporating appropriately quantized descriptions of achievable system responses. The information is organized by precision into levels of increasingly detailed description. Algorithms for the incorporation of new information into the hierarchy are considered part of the system's knowledge. Thus, a finite set of information about the system 100 is assembled, which, in association with search and retrieval algorithms, answers the same questions as the more familiar mathematical abstraction or model, viz, what is the effect on measurable or identifiable plant variables of a particular excitation. Learning is implemented by collecting and integrating experiences and by subsequent random testing in the intervals between experiences. Information about the same objects is represented at several appropriate levels of resolution (nested, hierarchical, local decomposition is a complicated but apt description of this principle). The ability to analyze gross behavior, as well as local perturbations is also built in for efficient analysis of alternatives. The source of a model can be tested or carried out on any of an existing plant, an exiting dynamic model of more or less arbitrary complexity, or a custom-built model with elements that include rules, look-up tables, equations, and empirical data. Subjective and inconsistent, as well as traditional cost or penalty criteria are locally evaluated and incorporated into a model for future analysis. The overall strategy is thus one which places the burden of determining and achieving performance goals upon the control system, as opposed to a system designer. The present invention reinforces the feedback control component of a control system, using the byproduct of the planning subsystem 106 and the planning component (using learning algorithms and the feedback derived from system operation), the control system 100 is provided with the attributes of intelligence.

The major operational steps of the present invention are preprocessing and data analysis, multiresolutional model design, cost evaluation and process improvement. The first step, preprocessing and data analysis, provides an adequate description of the plant or process 14 by constructing and validating a distributed multiresolutional provisional model of the plant or process 14. The multiresolutional model may be validated using a multi-valued graph representation, as described in more detail below. Cost evaluation may be performed using a sliding window to compute the costs of operation of the process in a tangible form. The sliding window permits the application of the model for process improvement which can then be measured in a consistent manner. The width of the sliding window is determined by the actual discretization of the available information and the required accuracy of results. The process improvement step represents the continual improvement of the process by applying search and optimization algorithms to the distributed model. Critical but previously unknown relationships of the process may be discovered during the preprocessing of information for the model.

The preprocessing subsystem 102 preprocesses the data 16 acquired from one or more sensors (not shown) throughout the plant or process 14. The preprocessing subsystem 102 is provided for preprocessing raw plant information or data 16 using hierarchial clustering algorithms in order to synthesize a multiresolutional knowledge base. The preprocessing subsystem 102 organizes the data 16 in the form of time-tagged quadruplets [SB, A, SA, V] where SB is "state-before", A is "action", SA is "state-after" and V is "value" strings. The preprocessing subsystem 102 may comprise, for example, a storage structure which allows for storing and organizing goal-dependent quadruplets of "experiences", their subsequent classification, and for performing accurate and plausible inferences upon the results of the classification.

Process variables are identified by plant operators and managers as those being critical to successful operation of the target system, process or plant 14. Another way of finding this set is clustering with determining existing correlations among the parameters. A set of process variables is initially defined and may be updated and expanded during the building of a model, if such additional variables are found to be necessary and are available. The process variables form what is conventionally known as a state space. The state space is bounded by the limits in each process variable and may be thought of as an n-dimensional box, where 'n' is the number of variables or axes of interest. In general, by virtue of the scope and interaction of parameters, groups of process variables are arranged hierarchically in accordance with subsystems of the plant 14, and are viewed as a single unit at higher levels of abstraction.

At this identification stage, the data 16 is collected at a sensor resolution for representing state trajectories in the form of strings, $S(x)=x(t+k\Delta t)$ for $k \geq 0$. A recursive approximation is then performed which organizes the data 16 on the basis of successively more precise state transitions in the form:

$$\{\Delta X: x_1, X_2 \in S(x), \text{ and } |x_1, X_2| > \epsilon\}_1$$

where $\epsilon_1$ is a measure of the level of precision (or resolution) of the transitions. The feasible transitions are ranked on the basis of a measure of the cost of the transition which is dependent on a cost function of interest and are stored as graphs of the appropriate level of resolution. The graphs have a structure which may be described by an ordered set $(V_p, V_c, C_t, U_t)$ which may be considered as a parent vertex, a child or successor vertex, the cost of the transition from the parent to the successor, and the associated input code. The hierarchy of graphs allows the examination of previously encountered local behaviors at increasing precision in a reduced subset of the underlying states which, in turn, permits the synthesis of more and more precise strategies of operation with reduced search complexity.

Since the construction of the hierarchical store of information is predicated on appropriate multiresolutional discretization of the subset of the state space in which the system 100 operates, and since the data 16 is collected with a precision that is, in general, not the same at each particular level of the hierarchy, local interpolation is necessary to determine feasible edges in the graphs. The search for feasible edges does not require abandoning the acquired data 16. Rather, the data 16 remains the basis point of the representation system while temporary nodes are computed so that the experiences can be adjusted to the required level of resolution.

The preprocessing subsystem 102 can be considered to perform the function of an observer, as well as a filter. Depending on the novelty or usefulness of the collected information or data 16, the preprocessing subsystem 102 passes filtered data 16 to a learning subsystem 126 and/or to the representation subsystem 104 directly. A bidirectional arrow, denoted 128 connecting the preprocessing subsystem 102 to the learning subsystem 126 represents handshaking signals for coordination purposes, in addition to a data path for passing the filtered data to the learning subsystem 126.

The representation subsystem 104 is a multiresolutional storage structure for organizing the system knowledge which integrates the information of experiences, i.e., the data 16 organized by the preprocessing subsystem 102. Although the representation subsystem 104 may receive information on-line, the information may also be loaded or partially loaded off-line and updated either directly through the preprocessing subsystem 102 or via the learning subsystem 126. The representation subsystem 104 extracts goal-independent data from goal-dependent data in the form of generalized rules, or components of the automata transition function and state output functions. For instance, standard algorithms and procedures for inverting experimental causalities into statements of rules may be used to extract goal-independent data. More sophisticated procedures can be applied, linked with algorithms and procedures of fusing the components of experiences into associative clusters. Such clusters form a function-oriented, goal-independent provisional model of the plant or process 14.

The necessary components of a single level of a multiresolutional representation may be identified as: a goal which is an optimal step on a path to a global objective; a set of criteria used to determine a path to the assigned objective at the current resolutional level; a description of the system at the resolution appropriate for the selection of an optimal path with respect to the objectives of the level; and optimization algorithms for synthesizing the optimal strategy based on the previous three elements.

In order to obtain such a provisional model, a mechanism of consecutive multivariable clustering is applied, interpretable as generalization. The provisional model is also based upon unifying groups of higher resolution information into lower resolution units. However, instead of using experiences having similar preconditions, action and effect as inseparable units, similarities and components of the experiences are used, which leads to rules generation without explicit demonstration of partial dependencies demonstrated in the raw data 16. Multiple goal-independent and time-independent rules are clustered into more general rule statements which produce a hierarchical system for storage and retrieval of rules.

Preferably, the representation subsystem 104 further uses the process of local interpolation, which introduces local errors in the computed costs of transitions in the graph. In order to establish that the errors which are introduced in this matter do not accumulate, several corrective measures may be taken. The simplest of these measures is to introduce a randomized shift to the discretization that is used for the graphs. The resulting structure is, therefore, organized as a random constellation of points of the state space rather than a conventional grid. In order to test the structure for a uniform distribution of errors, it is preferred to synthesize test trajectories and examine their estimated costs in conjunction with previously examined trajectories of operation.

The planning subsystem 106 searches the knowledge base generated by the preprocessing subsystem 102 and the representation subsystem 104 to select an optimal course of action (trajectory) and generates corresponding feed-forward control signals 114 which are sent to the arbitration subsystem 108 to carry out a predetermined assignment 124. The assignment 124 for the system 100 includes a description of a task to be performed, as well as any additional information, such as performance criteria or special considerations. The knowledge base may be searched either on-line or off-line. The planning subsystem 106 requires input from the representation subsystem 104 and possibly, from the learning subsystem 126. The output of the planning subsystem 106 comprises planned trajectories for variables and the feed-forward control signals 114, as well as the local information 120 retained from its most recent search.

The following properties of tessellation are provided by the preprocessing and representation subsystems 102, 104 which support the minimum-cost search for the planning/control trajectory. First, for systems with continuity, a recursive process of tessellation is assigned with a metric which generates a hierarchy with a virtue of addressability of all tessellata. The "all-through" addressability of the hierarchy is achievable using a decomposition strategy which allows for the property of having the state space address fully contained in the tessellatum name together with the level to which the state space belongs. Thus, the subsequent search cannot miss or misrecognize a tessellatum. Thus, the algorithm of reconsidering the hierarchy and adjusting the hierarchy is built into the system. Second, among all possible hierarchies which can be achieved by a space tessellation, there exists one hierarchy which delivers the most efficient (minimum cost) operation to the system to be controlled. Thus, the system is tuned in such a way as to have the above-mentioned number of hierarchical levels and the algorithm of tuning up the hierarchies is built into the system. Finally, by associating the tessellata with their centers as the representatives lead to detrimental results; the excessive organization of the space creates biased motion (the well known idiosyncracies of the grids). Therefore, representing the tessellata not by their centers but rather, by randomized representatives heals the process of computation and motion in the system. Thus, the algorithm of randomization in assigning the representative for a tessellatum is also built into the system.

The present invention embeds the results of the examining operation under different regimes exercised by a lower level control subsystem. Each elementary transition which fits within the constraints of being a transition from one tessellatum to another, is assigned the values of state transition in the corresponding costs obtained from the on-line measurements (at the particular resolution determined by the level of tessellation). The value of error is assigned in such a way as not to exceed the "size of a tessellatum" accepted at a particular level of resolution. Thus, a device for embedding local dynamics is also built into the system.

Several methods of search for optimal trajectories may be applied to the graphs pertaining to a particular level of resolution. For instance, Dijkstra's algorithm (or its heuristic evolvement, A-star algorithm) may be used, as follows:

1. Initialize a searah tree of size equal to the number of nodes in the graph with the edge from the start node to itself, with a transition cost of zero, and mark it "open" for future examination;
2. Select the cheapest "open" node in the tree and mark it "closed" (investigated);
3. If the goal node is achieved, traverse pointers to retrieve the solution path;
4. Expand the current node, generating all of its successors (children) from the graph;
5. For each child which has not been previously expanded
    5.1 If the child is not in the "to" column of the tree, add the new edge, else
    5.2 If the existing cost to reach the child is higher than the newly determined cost, switch the source node and the cost on the existing edge;
6. Go to step (2).

In the presently preferred embodiment of the invention, the above algorithm is modified to incorporate suboptimal variations by implementing changes in step (5). The purpose for the modification to step (5) is to allow successive refinement of the results found at low resolution to provide increasingly precise approximations to the globally optimal strategy of operation. Thus, step (5) is preferably modified, as follows:

5. For each child
    5.1 If the number of occurrences of the child are less than the prearranged limit, add the new data to the tree and mark the new child "open";
    5.2 Else if the new child has a lower cost than all existing ways of getting to that child then
        5.2.1 If the same (to, from) pair exists in the tree replace it with the new data and mark the new child "open";
        5.2.2 Else if two identical (to, from) pairs exist in the tree replace the more expensive one with the new data and mark the new child "open";
        5.2.3 Else replace the most expensive (to, from) pair with the new data and mark the new child "open";
    5.3 Else
        5.3.1 If the same (to, from) pair exists in the tree and it is more expensive replace it with new data and mark the new child "open";
        5.3.2 Else if two identical (to, from) pairs exist in the tree replace the more expensive pair with the new data;
            5.3.2.1 If the replaced edge was more expensive, mark the new child "open";
            5.3.2.2 Else add the incremental cost of the more expensive substitution to edges built from the previous node, if it has already been expanded;
        5.3.3 Else if the new pair is less expensive replace the most expensive (to, from) pair with the new data and mark the new child "open".

An envelope surrounding the result at each level of resolution is determined using the following algorithm:

1. Initialize a table of size equal to the number of nodes in the search graph with the goal node and the cost of including in the optimal path to itself as $C_{est}(x,x)=0$ and $C_{min}(x,a)=$cost of the optimal path.
2. For each open node, k, in the table:
    2.1 Mark the node closed;
    2.2 Compute an estimate for the cost of reaching the goal from each predecessor node, k-1, using $C_{est}(x,k-1) = C_{est}(x,k)+c(k,k-1)$; Derive $c(k,k-1)$ from the original graph and determine, from the search graph, the optimal cost $C_{min}(k-1,a)$ of reaching k-1;
    2.3 If the existing value of $C_{est}(x,k-1)$ is less than currently in the table, replace it, or if k-1 is not in the table, add it to the table and mark the node open;
3. Go to step 2.

The solutions are then refined in the new envelope by tessellating the space confined within the envelope at a finer level of resolution using the distributed store of data to fill in that volume only, thereby controlling the potentially explosive growth of complexity associated with conventional strategies of search for optimization. The width of the envelop is chosen based on known specifics of the problem. By providing search in the state space, analytical models are not required, and computations are both simplified and continually updated.

The prediction subsystem 110 generates suggested prediction control signals 116 for achieving optimal performance or operation of the plant 14. Local information or data 120, which is a byproduct of increasingly focussed search by the planning subsystem 106, is transferred to the prediction subsystem 110 as a set of increasingly precise investigations of successively tighter envelopes of a nominal trajectory. The prediction subsystem 110 operates on the principle that the best local course of action can be pre-planned to multiple short horizons in real-time by investigating the local data or information 120 generated by the planning subsystem 106 in conjunction with the plant data 16 and the predetermined assignment 124. Preferably, the prediction subsystem 110 is a predictive compensator.

The stabilization subsystem 112 is an optional element of the control system 100. The stabilization system 112 generates a set of safety control signals 118 for assuring that the system operates within a predetermined range, i.e. a range of safe operation. For instance, the safety control signals 118 may comprise shut-off signals for turning off a piece of equipment or machinery which is operating outside of a predetermined safe range of operation, such as outside of a predetermined temperature range. Use of the stabilization subsystem 112 presumes the knowledge of some suboptimal but safe compensation to which the system 100 may revert in the event of unexpected or destabilizing behavior. Alternatively, the plant 14 may be equipped with stabilizing feedback before the synthesis of the optimizing control signals 114.

The learning subsystem 126 correlates actual and expected performance data and continuously updates the preprocessing subsystem 102, the representation subsystem 104 and the planning subsystem 106. Preferably, a display 70 is coupled to the learning subsystem 126 which preferably combines graphical and textual information to allow a user to monitor operation of the system 100.

The arbitration subsystem 108 receives the feed-forward control signals 114 and generates corresponding process control signals 28 for controlling the operation of the plant or process 14. The arbitration subsystem 108 depends on the mode of operation of the overall system 100. In its simplest configuration, the arbitration subsystem 108 superimposes the excitation or feed-forward control signals 114 suggested by the planning subsystem 106 on the control signals 116, 118, respectively, computed by the compensatory elements, i.e., the prediction subsystem 110 and the stabilization subsystem 112. If, because of distributed decision making between the sources of actuation commands, prespecified limits such as hard bounds on inputs are violated, the arbitration subsystem 108 has the ability to modify the effective actuation accordingly. In case of unexpected behavior from the plant 14, the arbitration subsystem 108 can be used to switch out individual components of the actuating signals 114 or to halt operation of the plant 14 completely. Thus, the arbitration subsystem 108 acts as a summer or switch to the plant 14.

The control strategy of the present invention differs from the prior art (which tends to focus on analytical representations and parametric equations) by developing solutions (control signals) from the acquired data 16 at multiple resolution levels and sharing the control signals 114 in both an upward and downward fashion to satisfy the requirements of the system 100 as a whole, as well as system components.

The present invention eliminates the stage of mathematical abstraction and parameter identification and instead, uses collected measurements (the data 16) to form a distributed multiresolutional knowledge representation which is operated upon by search algorithms. The present invention eliminates the need for an explicit choice of a mapping from empirical data to a particular model structure and the conventional equations are replaced by a distributed representation.

The operation of a power generating station provides opportunities to study the symbiotic relationships of dependent and independent process variables at multiple and discrete levels of resolution. The required megawatt (MW) output demand of a power plant is controlled by a unit load control system. The output demand value is used in a constraining function to control power plant subsystems (e.g., fuel/air, feed water, turbine valves, etc.) such that the required megawatt demand is met. The need for an integrated, multiresolutional view of complex systems emerges as a result of attempting to obtain optimal performance from the system as a whole when it may, without loss of generality, be viewed as a collection of interacting subsystems-each with its own parameters, constraints, optimization criteria, cycle times, and each itself composed of interacting subsystems.

A typical organizational approach of operating power plants at multiresolutional levels of information comprises operations designed and submitted for execution at succeeding resolutional levels on the basis of a priori information concerning safe and achievable targets. By not implementing a representation for the incorporation of feedback from lower levels, higher level decision makers are typically not in a position to set targets which are truly the "best" by objective criteria. Examples of such criteria for a power plant are: maximum efficiency of energy conversion; minimum emissions; maximum reliability of equipment and systems; and maximum flexibility of operation. In general, the list of potential performance criteria is large, but not as large as the number of controlled variables in the power plant, which number in the thousands. The organization of the variables into a hierarchy of significance (with respect to the most general aims of the process) is the first step in building a hierarchical representation of the system. This hierarchy of significance, while grounded in the basic physics of the process, is made at each level of the organizational hierarchy. As a result, although the fuel/air ratio has a very significant effect on unit performance, the scheduling of plant operations by the management level is typically driven by a monthly, or quarterly value of average efficiency, rather than variables of that nature.

Figure 4:
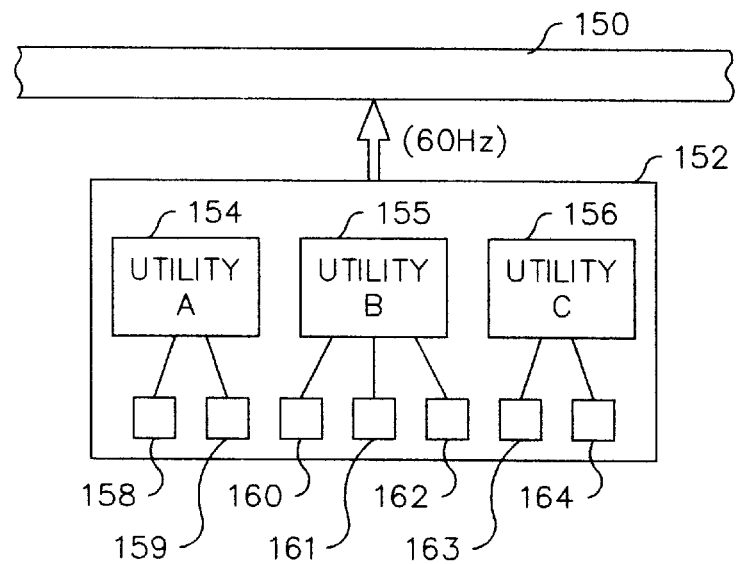
FIG. 4 is a schematic block diagram of a power generation company which supplies power to a regional power grid.

Referring now to FIG. 4, an electric grid 150 which supplies power to a region is managed by a power company 152, with power generated by several utility companies 154, 155, 156, each of which generally includes a plurality of power plants 158–164, with each power plant 158–164 generally including a plurality of power generating units (not shown). The power company 152 is responsible for maintaining stable grid conditions through the use of base loaded, cycling and peaking power plants. Loading of the grid 150 is signaled by the frequency of the power supply by the utilities 154–156. Generally, there is a band around the 60 Hz bus frequency within which the overall system must operate, and changes in this frequency indicate that the power generation capacity of the system must be adjusted. The individual utility companies must meet changes in capacity within an established time period.

The average cost of operation of a power plant under a utility company's control may be based on a parameter called lambda which indirectly reflects the cost of generation and is a function of both demand and production. The scheduling of individual plants is performed on the basis of a single averaged indicator.

Figure 5:
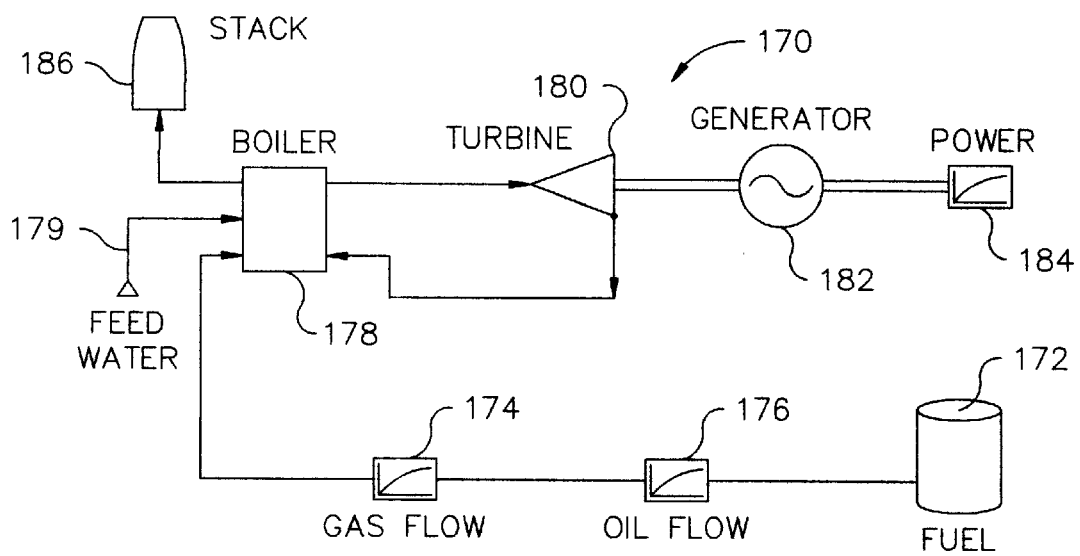
FIG. 5 is a schematic block diagram of a power generation unit.

Referring now to FIG. 5, a schematic block diagram of a power generating unit 170 is shown. Generally, the power generating unit 170 comprises a source of fuel 172, such as a natural gas line or a fuel storage facility, fuel flow controls, such as a gas flow meter 174 and an oil flow meter 176 for regulating and measuring fuel flow. The power generating unit 170, in addition to fuel resource elements, further comprises power generating elements, such as a boiler 178 for heating feed water 179, a turbine 180 driven by the heated water or steam, and a generator 182 coupled to the turbine 180 for generating or producing output power 184. The boiler 178 is also connected to an exhaust stack 186 for dissipating emissions, such as NOx and Sox. The power generating unit 170 has a predetermined range of economical operation. For instance, the unit 170 may produce power in a range from 90 MW–425 MW, with changes within the output power range varying in multiples of 40 MW. Thus, for example, an operating point change could be from 320 MW to 360 MW or from 120 MW to 400 MW.

Operating point changes are usually controlled based on previously established safety/economic criteria. For instance, operating point changes may be limited to 1% per minute (or 4 MW per minute). The operation is preprogrammed based on a knowledge of BTU/MW and a fuel heat content figure in BTU/fuel unit. Thus, the turbine 180 ramping and fuel increase is performed simultaneously (coordinated control), by following a stored curve for each. The BTU/MW is a steady-state figure. Within the power generating unit 170, steam temperature should ideally be at 1000° F. for the first stage of the steam turbine 180 and the same at the outlet of the reheater for the secondary stages. However, at 20% load, the heat produced may not be adequate and the steam temperature at the reheater is allowed to go as low as 940° F. Similarly, the boiler 178 pressure falls from 2400 psi at full load to around 1050 psi at low load.

Feed-forward control (a reference curve or trajectory) is used for feed water 179, drum pressure, steam temperature and air flow excess in addition to fuel. The fuel supply system 172 is operated with feed-forward and feedback control. First, volumetric consumption for steady-state production of a particular power output 184 is determined from a stored curve, expressed in terms of the rate at which fuel (both oil and gas) is burned to have a sustained supply of heat for the boiler 178, as the boiler 178 supplies the correct steam conditions to the turbine 180. A volumetric set point is provided to a loop that measures differential flow (consumption). Individual burners are capable of providing 150 MBTU with a 50% turn down. This means that the operating range of a burner is from MAX/2 to MAX (in gallons/min) and if "n" burners are in service, (n×MAX) down to (n×MAX/2) gallons may be forced out of the fuel supply nozzles. If more or less fuel is to be burned, additional burners must be brought into or taken out of service. In order to change the flow through the nozzles, the feedback system changes the differential pressure across the whole set of open nozzles until enough fuel is forced out of the nozzles. The amount of fuel to be burned is primarily set by the reference curve, however, the number of burners which can supply that volume is not unique. The operator in the control room is able to use his experience of usual demand and, if he expects a large increase in demand, to introduce several burners early (thereby lowering the flow/burner) in anticipation of an increase. The flow controller compensates for the number of burners by changing fuel pressure to contain fuel consumption at the feed-forward set point.

As previously discussed, many systems and processes possess symbiotic relationships of both dependent and independent data. In the power plant application, independence of variables is minimal. Unit load demand is determined by requirements of the regional electrical grid 150 and is assigned based upon judgments of the power company 152 and the utility companies 154–156. In the power plant generating control system in accordance with the present invention, three resolution levels of interest are identified on the basis of current industry practice, as follows: (1) the grid level at which a schedule of operation for each power generating unit is developed; (2) the unit level where the required power capacity should be developed in the most cost effective manner; and (3) the unit system level which has been broken down into entities such as fuel management system, feed water system, reheat control system, etc. Because optimization of fuel consumption directly translates to the global objective of improvement in unit operating efficiency, an intermediate unit level of resolution is analyzed and recommendations (e.g., control signals 114) are made concerning the operation of a single unit in a manner which reduces costs, in terms of dollars per megawatt sold. As will be apparent to those of ordinary skill in the art, the described analysis and optimization techniques can be applied at each level of resolution, and therefore, extensions of this analysis can be made both up and down the hierarchy of concerns. Having a means of optimizing unit performance, it is possible to develop an optimal unit scheduling strategy (a higher level concern) using the same tools of analysis. Similarly, the optimal manner of controlling the unit systems is determined using the unit scheduling strategy as the goal to be achieved at the next level of resolution.

Initially, sufficient data must be collected to build a model of the process for efficiency analysis. In the electric power example, currently known data collection techniques may be used. For example, a Bailey Network distributed control system may be used to collect and maintain a history of the operating parameters for a power plant. Such a control system provides sufficient data for construction of a model. The variables initially selected for analysis in this example are based on parameters traditionally used by power companies to provide an overview of the unit condition. This results in the selection of a redundant set of variables for which data is collected by a plant control system. For instance, in the presently preferred embodiment, data is collected at one minute intervals over a predetermined period, such as a five day period. These variables are: (1) gross load; (2) auxiliary load; (3) main steam flow; (4) main steam pressure; (5) main steam temperature; (6) feed water flow; (7) final feed water temperature; (8) boiler drum pressure; (9) air heater output temperature; (10) turbine throttle pressure; (11) fuel temperature; (12) unit fuel gas flow; (13) unit fuel oil flow; (14) excess air; (15) SOx; and (16) NOx.

These parameters are culled based on their direct impact on the global objective of improved unit efficiency in the opportunity to control their value. This global objective is formulated for a level of resolution under consideration. For example, while SOx and NOx are important traditional parameters which characterize an emissions system, SOx and NOx do not directly impact on the unit efficiency (although emissions are monitored to ensure compliance with environmental regulations and to ensure that regulatory constraints are not a significant factor in the vicinity of the determined optimal operating trajectory). Also, while excess air flow does impact directly on the efficiency of the power generating unit 170, air flow is slaved to fuel flow and provides little opportunity for control. Of course, some dependency relationships exist among the selected variables. Moreover, some variables are difficult to control or are directly related to other parameters. For instance, the temperature and rate of flow of the feed water 179 are functions of the environment (e.g., water temperature varies with the season, for example from 85° in the summer to 35° in the winter), and are generally uncontrolled by a power plant.

The present invention determines a minimal set of variables which are used to carry out the desired optimization. The elimination of redundant variables allows optimization within a lower dimensional space, resulting in exponential reductions in complexity. If the performance of a power unit is not strongly correlated with certain variables, or if such variables can be independently controlled, then the examination of the effects of the variables can be deferred to the next level of resolution without significantly affecting the results of optimization.

The present invention accumulates selected transients from the acquired raw data 16. For example, the generator gross power output 184 is identified as the output of the system. The input is the total heat supplied per unit timed by the combination of fuels. Controllable parameters having a direct impact on the efficiency of the unit 170 are turbine throttle pressure and main steam temperature. These variables were selected based first on assumptions concerning thermodynamic state variables and second, on the fact that the other variables examined may be treated as constraints which must simply be maintained within their normal operating range.

From specifications and actual measurements, the operational limits for each variable were selected as follows:

$80 \leq x_1 \leq 450$ (MW)

$950 \leq x_1 \leq 1020$ (° F.); and $950 \leq x_3 \leq 2450$ (PSI).

Changes in the operating point of the unit 170 are mapped into a close subset of a three dimensional state space. The goal of optimization is stated as the determination of the trajectory from a particular power, temperature, and pressure to another, in a manner which minimizes fuel consumption per net MW during the transition along the complete trajectory from the beginning to the end.

Optimization is carried out using a multiresolutional representation built from the accumulated data 16, rather than calculated from a mathematical model. Search algorithms allow the synthesis of trajectories at several levels of precision. The present invention utilizes empirically determined information (the data 16) directly, and controls the growth of search complexity by recursively examining a smaller envelope in the state-space to determine the global optimum with increasing precision. The present invention performs the following steps:

(a) Tessellation or discretization;

(b) Determination of transition costs in the tessellated space;

(c) Search for the optimal trajectory at the current level of precision;

(d) Determining the envelope around the trajectory for using at the subsequent stage of refinement; and (e) Successive refinement of the trajectory by utilizing a finer tessellation (or quantization level) within the envelope found at the previous stage.

Tessellation results in a partitioning of the state space into subsets identified by labels corresponding to their state-space location. The labels correspond to an indistinguishable "vicinity" in the state space and form an equivalences relation in conjunction with the indistinguishability measure. The smaller the tessellation size, the larger the set of labels, by an exponential factor corresponding to the dimensionality of the space. The valid transitions in the tessellated space are determined from the collected data 16. The transitions are established by connecting randomly perturbed centers of the tessellata (vicinities or boxes) using evidence from the data 16. Costs are assigned based on the accumulation of net costs per unit time over an interval required for the completion of each transition. Completion of a transition is defined as the point of closest approach to the state corresponding to a label, where distance is computed using the weighted 1-norm for the sake of simplicity. The input for each transition is approximated by a piecewise constant rate of combustion computed from the average of the rate at the start and end of every transition.

Figure 6A:
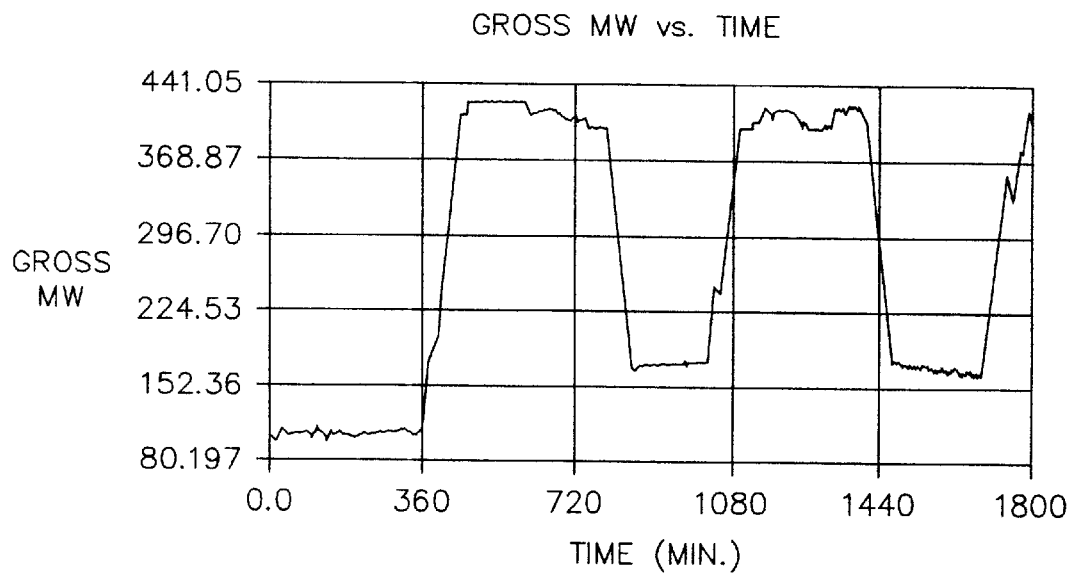
FIG. 6A is a graphic illustration of the relationship between output power and time for a power generation unit.
Figure 6B:
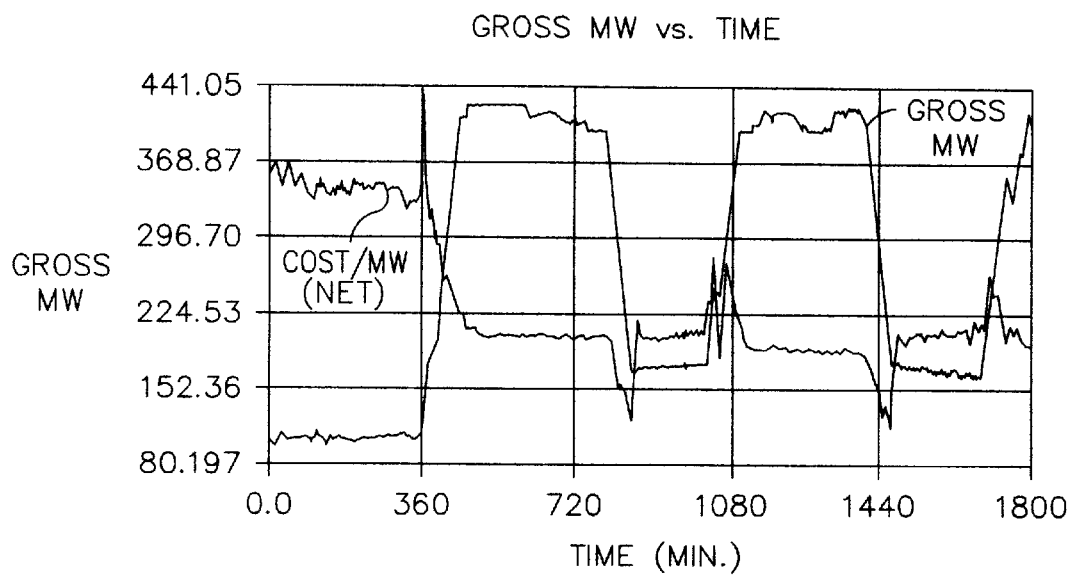
FIG. 6B is a graphic illustration of the relationship between output power against time (FIG. 6A) overlaid on a corresponding generating cost in terms of BTU/MW.
Figure 6C:
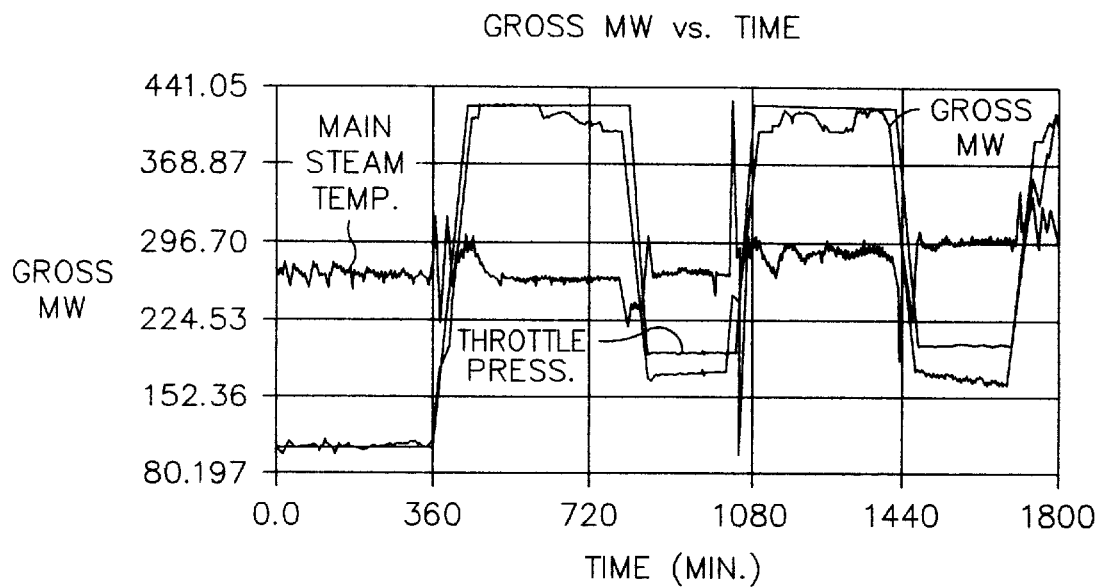
FIG. 6C is a graphic illustration of the relationship between output power against time overlaid on generating cost (FIG. 6B) shown with the accumulation of selected transients from acquired raw data.

Referring now to FIG. 6A, a plot of the gross power output 184 developed during a 30 hour period against time generated by the preprocessing subsystem 102 is shown. FIG. 6A shows the typical behavior required from a power plant, such as one of the power plants 158–164. In FIG. 6B, the plot of power output 184 against time (FIG. 6A) is overlaid on a corresponding generating cost in terms of BTU/MW. The cost per net MW is computed by sliding an adjustable width averaging window along a time axis and combining fuel BTU expenditure figures for both oil and gas on the basis of measured caloric value. FIG. 6B illustrates that the per unit cost of production of power is significantly higher for power output below a level of about 160 MW than for power above such level. Cost peaks are associated with all increases in power output. The goal of optimization is to characterize the manner of increasing power output which minimizes the cost per net MW. From FIG. 6B, it is apparent that a potential source of savings is associated with transients during load shifting, and especially during ramping. Thus, the system focuses on transient behavior and characterizes the manner of increasing output which employs the least energy. FIG. 6C shows the accumulation of selected transients from the raw data 16. Such selection of transients may be conducted manually by an operator or automatically, using pattern recognition algorithms. The selected transients are preferably combined and presented to the representation subsystem 104.

Figure 7A:
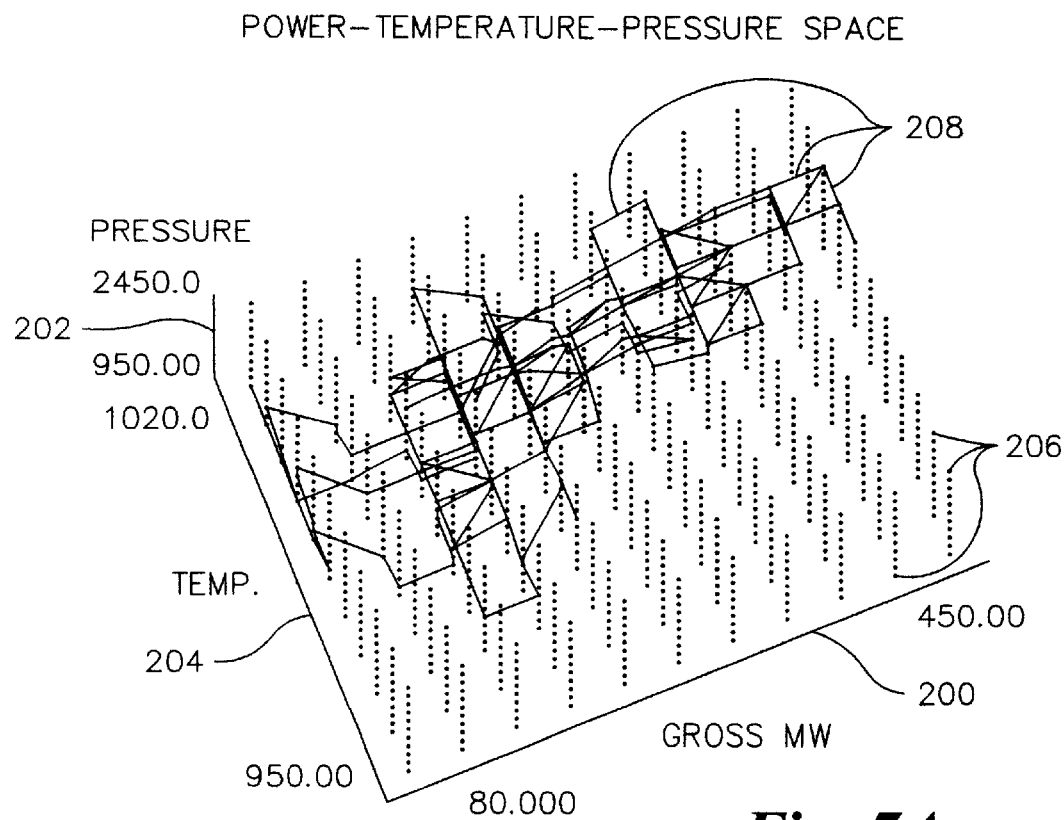
FIGS. 7A–7C are graphic illustrations of a three dimensional state space at varying levels of resolution.
Figure 7B:
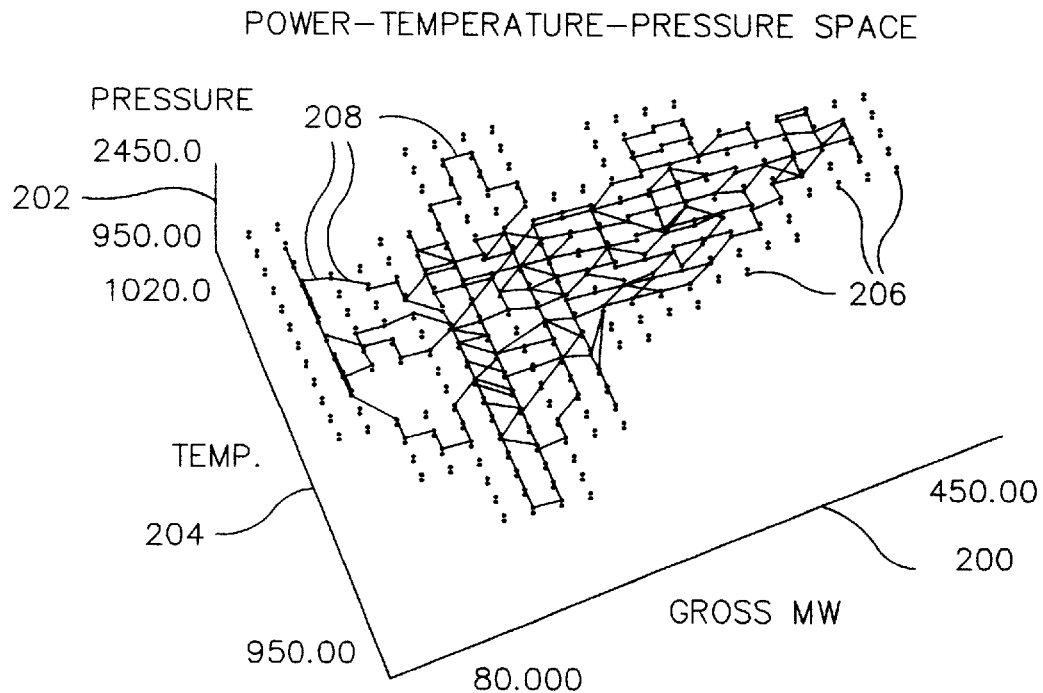
Figure 7C:
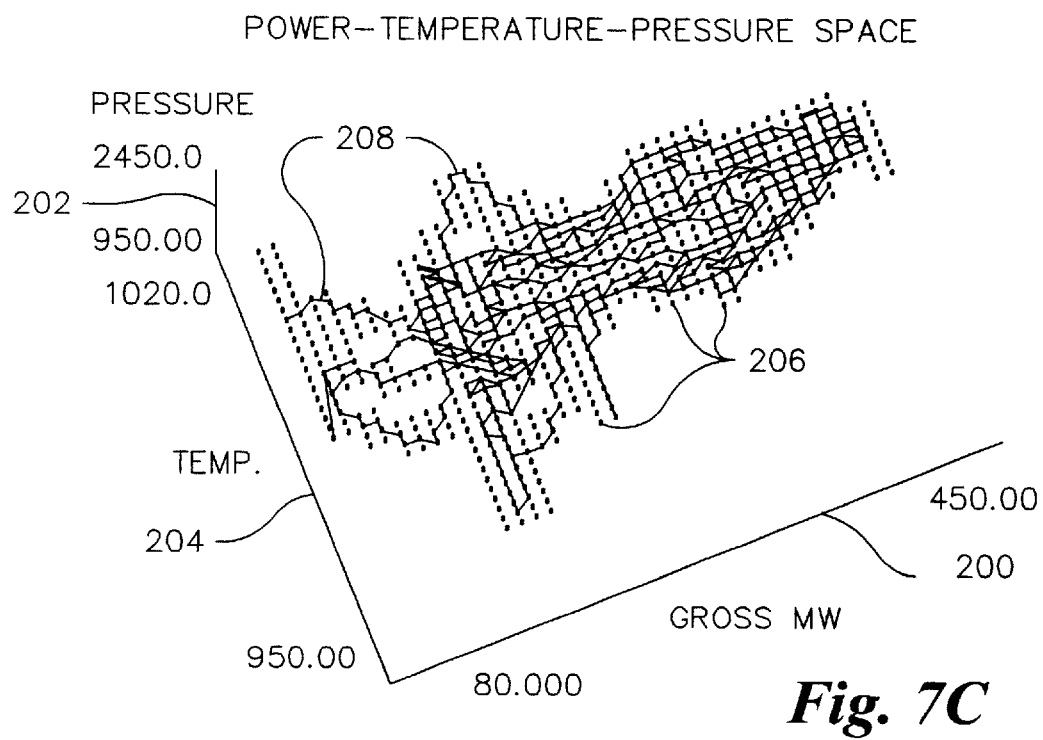

The process of incorporating the data 16 into a consistent representation is controlled by the representation subsystem 104. The representation subsystem 104 abstracts the data 16 into a multiresolutional representation by consecutive bottom-up multivariable clustering (generalization). Referring now to FIGS. 7A–7C, in the case of the power plant example, the state-space has only three dimensions and is given a tangible graphic interpretation. In FIG. 7A, the entire space of practical operation (the work space) for the power unit 170 is shown. The axes are power 200, pressure 202 and temperature 204. The thermodynamic variables of pressure and temperature provide sufficient indicators of process dynamics to generate a first approximation. Pressure is measured at the turbine throttle and temperature at a preceding measurement stage. Individual points 206 within the space represent a label or marker to a distinct range of operating points. A range of operating points (per marker) is associated with the respective marker, using the measure of indistinguishability at a particular resolution level. For the first resolution level (FIG. 7A), each point represents a range of power output of about 35 MW, 1350 psi, and 6° F. The points actually form a cloud which is depicted as a grid in order to simplify the presentation of the results. The lines or edges 208 connecting the points 206 in the grid mark the existence of stored information about ways of moving from one operating point 206 to another operating point 206 at the level of resolution (and their costs). This information is stored with the limited precision of this rough level of resolution. The purpose of this information is to delineate a region of the space on which to focus while examining a particular range in the power output level 184. FIG. 7A illustrates only a limited amount of information since it is drawn from only a few days of operation. However, it will be apparent to those of ordinary skill in the art that much greater amounts of information can be handled by the present invention.

The acquisition and storage of the data 16 may be performed either automatically and/or manually and also may be performed either off-line and/or on-line. An important feature of the present invention is the ability to automatically integrate information while monitoring a process on-line. The automation of the preprocessing subsystem 104 and the structure of the constructed model allows the updating of information whenever changes in system behavior become apparent. FIGS. 7B and 7C show subsets of the space at increasing resolution. In general, having collected huge amounts of data, it is not computationally feasible to study the whole space when looking for particular optimal paths. Accordingly, the preprocessing subsystem 102 preferably includes an algorithm for pruning the space before proceeding at higher resolution levels constructing the envelope for the subsequent search). In the general case, the number of variables studied as a group is often larger than three. The functioning of the present invention is not affected by this fact, however, the convenient graphical symbolism is lost. Of course, groups of three or less variables may still be viewed at the same time. The purpose of FIGS. 7A–7C is only to provide a clear and tangible interpretation of the approach used by the present invention. Between the first and third levels of resolution (FIGS. 7A and 7C), the tessellation sizes are halved between levels of resolution, such that the spatial density of the tessella increases four times between FIGS. 7A and 7C.

The purpose of constructing the multiresolutional representation, in general, is to allow the efficient use of search at the initial level for the optimal strategy for making the operating point low resolution transitions required during normal operation of the power generating unit 170, followed by the selection of a subset of the representation at the next level for more refined search. If this strategy is not implemented, the number of points which must be searched for an adequately precise solution is prohibitive. The planning subsystem 106 performs a search at several levels of resolution before arriving at a solution (optimal trajectory) of appropriate accuracy. A variation on Dijkstra's search algorithm, as previously discussed, is applied to the distributed graph representation (FIGS. 7A–7C) to determine optimal strategies of control.

Figure 8A:
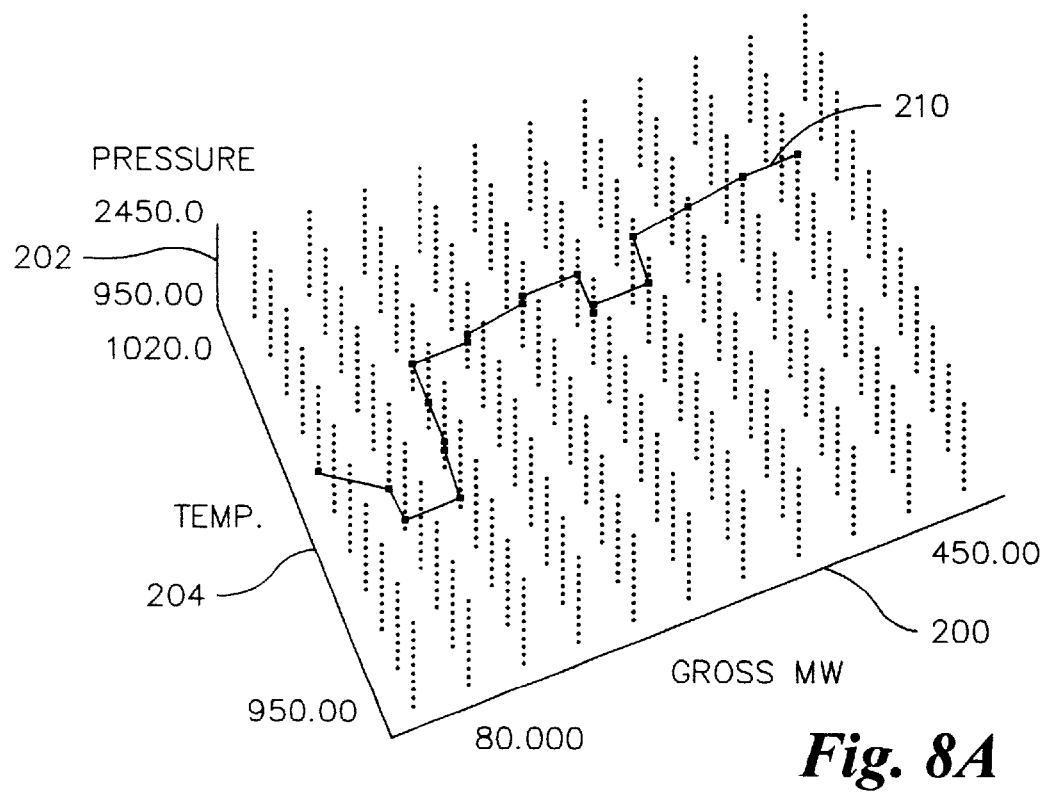
FIGS. 8A–8B are graphic illustrations of search results for an optimal operating trajectory of the state space of FIGS. 7A and 7C, respectively.
Figure 8B:
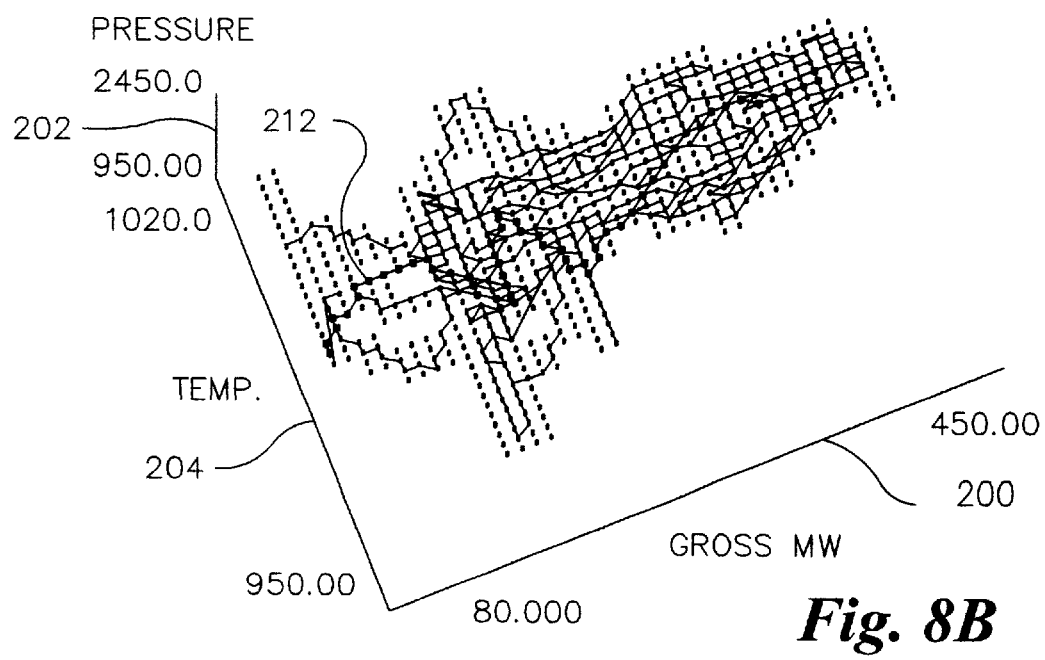

FIG. 8A shows the results of searching for a single solution trajectory 210 at the first level of resolution and FIG. 8B shows the results 212 for searching for a single solution trajectory at the third level of resolution. The objective of the analysis is to find the most fuel efficient way of changing the operating point of the unit 170 from that corresponding to an output of 90 MW to one corresponding to an output of 400 MW. The throttle pressure change corresponding to a change in the power output 184 is from 1000 psi to 2400 psi and the temperature change is from 990° F. to 1000° F. The variation on the standard search algorithm is designed to allow the examination of suboptimal paths, which results in the ability to determine a locus of paths whose costs differ from an optimum (at the current level) by an amount that is less than an assigned threshold. This locus is used to select an envelope around the optimum which is expected to yield a more precise result at the next level of resolution. The refinement is continued until an acceptable degree of precision is attained. The total number of levels in a multiresolutional hierarchy is determined by the overall space of interest at the lowest level of resolution, by the final accuracy at the highest level of resolution, and by the condition of minimizing computational complexity. The search results at the third level of resolution are shown in FIG. 8B. FIG. 8B is a three-dimensional plot which superimposes the optimal state trajectory for an output transition from 90 MW–400 MW on the data 16.

Figure 9A:
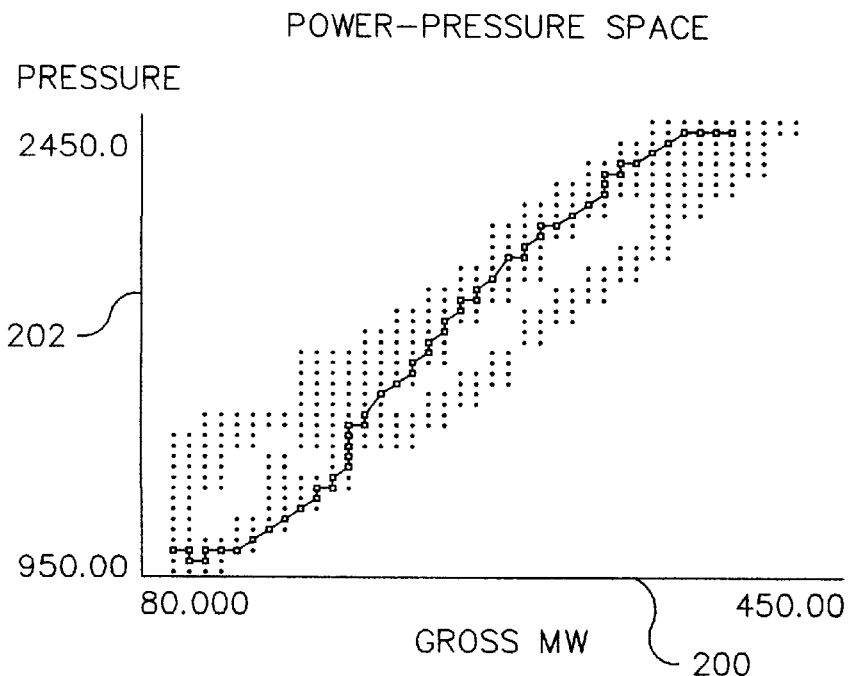
FIGS. 9A–9B are two-dimensional graphic illustrations of FIGS. 8A–8B (power against pressure and temperature, respectively)
Figure 9B:
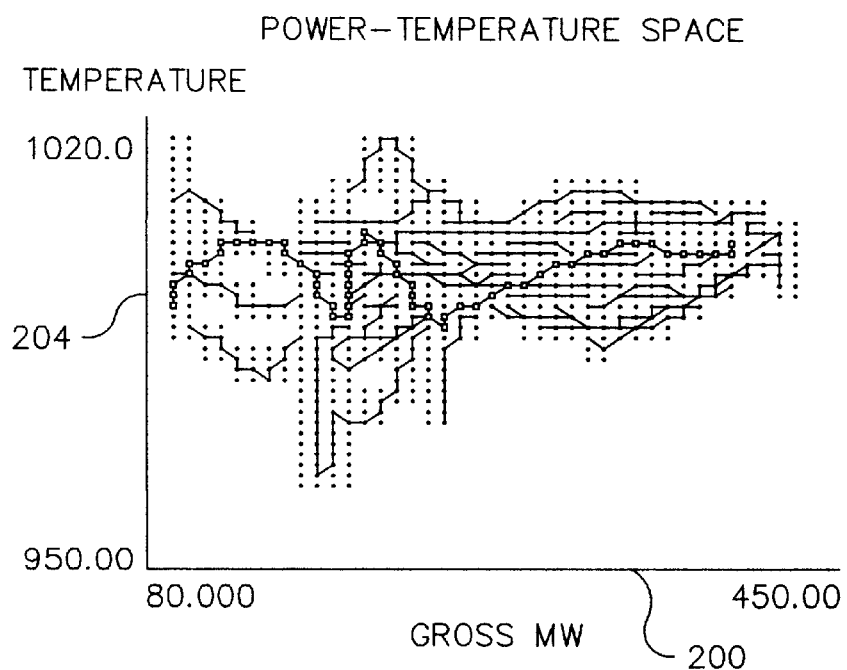

FIGS. 9A and 9B are two-dimensional plots (i.e. a decomposition of FIG. 8B) of the power 200 against the pressure 202, and the temperature 204, respectively. FIGS. 9A and 9B are shown in order to provide a more intuitive feeling for the suggested strategy. FIGS. 9A and 9B show the optimal pressure-power plot and temperature-power plot, respectively, for a cycle of output change from 90 MW–400 MW and back down to 90 MW and illustrates how parameters and variables should move to maximize unit 170 efficiency. The approximate cost of the suggested path during ramp-up is about 110 MBTU-hr. From FIG. 9A and FIG. 9B, it is clear that the suggested strategy allows (acceptable) fluctuations in steam temperature, and imposes a linear relationship between pressure 202 and power 200 in all but the initial stages of an increase in the power output 184.

The envelope creation algorithm, which is also used for selecting a subset of the space for further refinement during transitions from lower to higher resolution, provides data on other strategies attempted during the same increase of output. According to this information, the process of ramping the power generating unit 170 should be more uniform and closer to the optimal curves suggested. Accordingly, the control signals 114 generated by the planning subsystem 106 attempt to control the unit 170 in order to make the ramping up process more uniform. Additional data may be used to make this analysis more comprehensive and accurate (with additional levels of representation which are inappropriate without the corresponding data).

Figure 10:
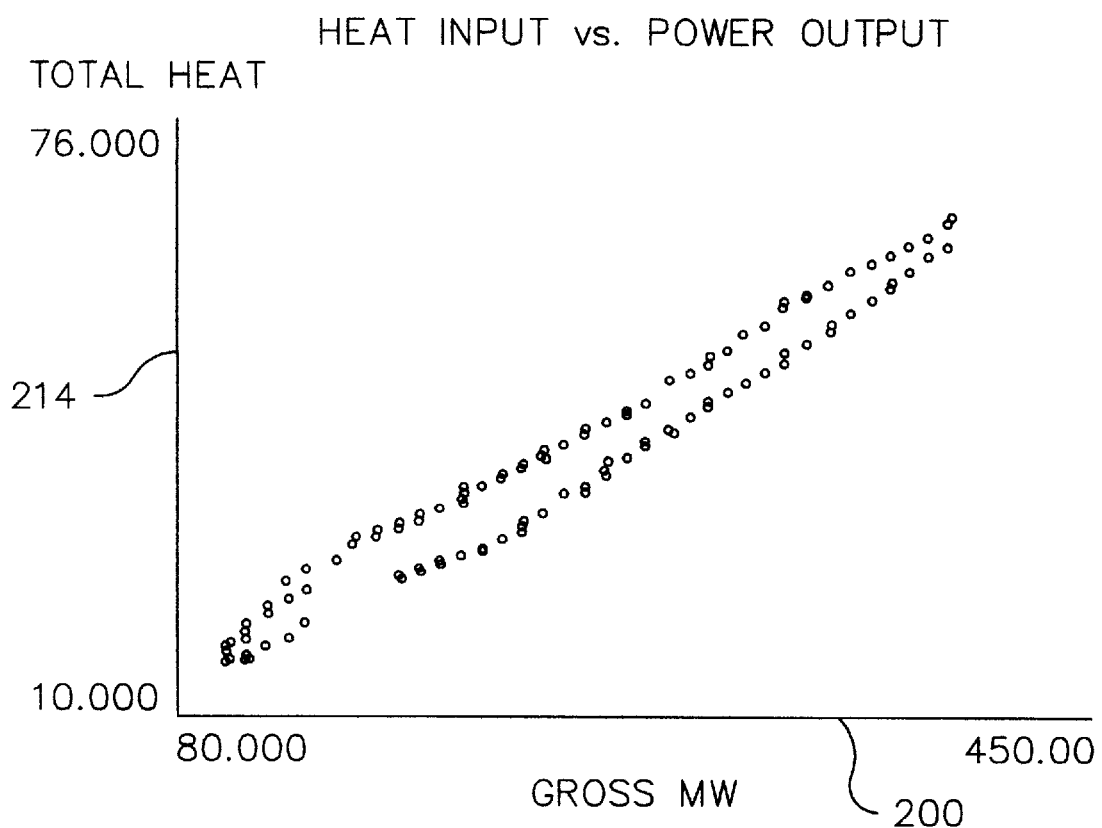
FIG. 10 is a graphic illustration of heat against power.

FIG. 10 shows the suggested heat input 214 required (in terms of BTU) for following the optimal trajectories determined by the control system. The heat input 214 is shown in terms of BTU and is plotted against power output. Using known fuel cost information, such as the cost of oil or gas, specific oil and/or gas flow rates may be calculated to determine the efficiency of the unit 170.

From the foregoing description, it can be seen that the present invention comprises a multiresolutional decision support system for multiresolutional analysis of data from diverse sources or subsystems to formulate plans or rules of system operation which enhance system performance. The foregoing describes the application of multiresolutional analysis techniques to an operating power plant. However, the principles disclosed herein, e.g., data structuring and organizing, selective parameter lumping and search-based optimization methods can be applied to any system or process possessing the attribute of semiotic variables which result in a multiresolutional array of information. That is, other process systems, such as those found in fabricating plants, chemical facilities, refineries, and the like, can benefit in similar fashion to the analysis and modeling techniques described herein. The present invention is also useful for a number of other systems and activities which have not been previously recognized as possessing semiotic characteristics and which cannot be adequately modeled mathematically, such as assembly, packaging and warehousing facilities and mission definition and analysis. It will be recognized by those skilled in the art that changes may be made to the above-described invention without departing from the broad inventive concepts thereof. It is understood, therefore, that this invention is not limited to the particular embodiment disclosed, but is intended to cover any modifications which are within the scope and spirit of the invention as defined by the appended claims.

What is claimed is:

1. In a power plant, a planning and control system for determining output trajectories of a predefined output behavior and input control commands for achieving the predefined output behavior, the system comprising:

(a) means for acquiring data related to at least one process variable of the power plant;

(b) means for organizing the acquired data and generating at least one state input-output string therefrom;

(c) means for fusing the strings into associative clusters, the clusters forming a function oriented, goal-independent provisional model of the power plant;

(d) means for generating a multiresolutional data structure based upon the associative data clusters for transforming the provisional model into at least one level of resolution incorporating embedded local dynamics of the power plant;

(e) means for searching the multiresolutional data structure at varying levels of resolution to determine an optimal trajectory of operation for achieving the predefined output behavior; and (f) means for generating control signals for controlling at least one operational variable of the power plant such that the power plant operates according to the optimal trajectory.

2. The system of claim 1 wherein the data is acquired on-line and the search is conducted off-line.

3. In a power plant, a method for determining output trajectories of a predefined output behavior and input control commands for achieving the predefined output behavior, the method comprising the steps of:

(a) acquiring data related to at least one process variable of the power plant;

(b) organizing the acquired data and generating at least one state input-output string therefrom;

(c) fusing the strings into associative clusters, the clusters forming a function oriented, goal-independent provisional model of the power plant;

(d) generating a multiresolutional data structure based upon the associative data clusters for transforming the provisional model into at least one level of resolution incorporating embedded local dynamics of the power plant;

(e) recursively searching the multiresolutional data structure at varying levels of resolution to determine an optimal trajectory of operation for achieving the predefined output behavior; and (f) generating control signals for controlling at least one operational variable of the power plant such that the power plant operates according to the optimal trajectory.

4. The method of claim 3 wherein step (e) further comprises synthesizing optimal trajectories of process operation using a search applied to the multiresolutional data structure at successively higher levels of resolution with subsequent propagation of the search results to successively lower levels of resolution.

5. The method of claim 3 wherein the data is acquired on-line and the search is conducted off-line.

* * * * *